US009298696B2

(12) United States Patent
Marian et al.

(10) Patent No.: US 9,298,696 B2
(45) Date of Patent: Mar. 29, 2016

(54) SEMANTIC APPLICATION LOGGING AND ANALYTICS

(71) Applicant: Bank of America Corporation, Charlotte, NC (US)

(72) Inventors: Radu Marian, Charlotte, NC (US); Paul J. Castillo, Simi Valley, CA (US); Gregory Sito, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 23 days.

(21) Appl. No.: 14/296,143

(22) Filed: Jun. 4, 2014

(65) Prior Publication Data

US 2014/0288923 A1    Sep. 25, 2014

Related U.S. Application Data

(63) Continuation-in-part of application No. 13/801,286, filed on Mar. 13, 2013, now Pat. No. 9,075,791.

(60) Provisional application No. 61/740,200, filed on Dec. 20, 2012, provisional application No. 61/955,280, filed on Mar. 19, 2014.

(51) Int. Cl.

| *G06F 17/27* | (2006.01) |
|---|---|
| *G06F 11/30* | (2006.01) |
| *G06F 17/30* | (2006.01) |
| *G06F 11/34* | (2006.01) |
| *G06Q 10/00* | (2012.01) |

(52) U.S. Cl.
CPC ............ *G06F 17/2735* (2013.01); *G06F 11/30* (2013.01); *G06F 11/3476* (2013.01); *G06F 17/30734* (2013.01); *G06Q 10/00* (2013.01)

(58) Field of Classification Search
CPC ....... G09B 7/04; G06Q 10/10; G06Q 20/102; G06Q 10/06; G06F 9/4446
USPC ...................... 704/10; 705/3, 2; 707/758, 755
See application file for complete search history.

(56) References Cited

U.S. PATENT DOCUMENTS

| 5,151,857 A | 9/1992 | Matsui |
| 7,177,798 B2 | 2/2007 | Hsu et al. |
| 2002/0198739 A1* | 12/2002 | Lau et al. ........................ 705/3 |

OTHER PUBLICATIONS

"Open Technical Dictionary," Electronic Commerce Code Management Association; retrieved from <http://www.eccma.org/whyeotd.php> on Nov. 20, 2013.

(Continued)

*Primary Examiner* — Charlotte M Baker
(74) *Attorney, Agent, or Firm* — Banner & Witcoff, Ltd.; Michael A. Springs

(57) ABSTRACT

A system for managing dictionaries, such as an application dictionary and a domain dictionary, and for adding entries to a data log is described herein. The system may, in response to a determination that an event occurs at an application, determine that the application uses a first concept name from the application dictionary to describe the event. An entry for the event may be added to a data log for the application. The entry may also include the first concept name from the application dictionary. A mapping of the first concept name from the application dictionary to a second concept name from the domain dictionary may be generated. In some aspects, the data log may be sent to a data log analysis system capable of accessing the domain dictionary.

18 Claims, 15 Drawing Sheets

(56) References Cited

OTHER PUBLICATIONS

"JSON-LD 1.0: A JSON-based Serialization for Linked Data," W3C; retrieved from <http://www.w3.org/TR/2014/REC-json-Id-20140116/> on Mar. 17, 2014.
"5 Star Open Data," 5 Star Open Data; retrieved from <http://5stardata.info/>on Mar. 17, 2014.
"COPS Overview," Farmer, Dan; May 18, 1993; retrieved from <http://fish2.com/cops/overview.html>.
"FAQ: All About the New Google "Hummingbird" Algorithm," Sullivan, Danny; Sep. 26, 2013; retrieved from <http://searchengineland.com/google-hummingbird-172816>.
"The Type Hierarchy," Schema.org; retrieved from <http://schema.org/docs/full.html> on May 21, 2014.
"What is Schema.org?,"Schema.org; retrieved from <http://schema.org/> on May 21, 2014.
"Do You Know What Cyber Attackers Look like?," Palantir, retrieved from <http://www.palantir.com/> on May 21, 2014.
"IT Risk," Wikipedia; retrieved from <http://en.wikipedia.org/wiki/IT_risk> on May 21, 2014.
"Introducing JSON," JSON; retrieved from <http://www.json.org/> on May 21, 2014.
"JSON for Linking Data," JSON-LD; retrieved on May 21, 2014.
"Network Security, Vulnerability Management, Web Application Security, Threat Protection, PCI & Policy Compliance," Qualys, Inc.; retrieved from <https://www.qualys.com> on May 21, 2014.
"Operational Intelligence, Log management, Application Management, Enterprise Security and Compliance," Splunk; retrieved from <http://www.splunk.com/> on May 21, 2014.
"Security Information Management and event Management (SIEM)," Hewlett Packard; retrieved from <http://www8.hp.com/us/en/software-solutions/siem-arcsight/> on May 21, 2014.
"DBpedia," DBpedia.org; retrieved from <http://dbpedia.org/About> on May 21, 2014.

* cited by examiner

SEMANTIC APPLICATION LOGGING AND ANALYTICS

CROSS-REFERENCE TO RELATED APPLICATIONS

This application is a continuation-in-part of U.S. patent application Ser. No. 13/801,286 filed on Mar. 13, 2013 and entitled "ENTERPRISE CONCEPT DEFINITION MANAGEMENT," which claims priority to Provisional Patent App. No. 61/740,200 filed on Dec. 20, 2012 and entitled "ENTERPRISE CONCEPT DEFINITION MANAGEMENT." This application also claims priority to Provisional Patent App. No. 61/955,280 filed Mar. 19, 2014 and entitled "SEMANTIC APPLICATION LOGGING AND ANALYTICS." The entirety of each of the three aforementioned applications is herein incorporated by reference.

TECHNICAL FIELD

Aspects described herein relates in general to electronic dictionaries and in particular to maintaining consistent definitions for entries in an electronic dictionary using a common identifier.

BACKGROUND

Enterprises such as corporations may include multiple business units operating within various domains, e.g., ontologies. Each unit may seek to model the various concepts, attributes, terms, processes, and the like within its particular domain. As part of the domain modeling process, a unit may define and describe the concepts relevant to its particular domain.

In some circumstances, a concept may be relevant to multiple units within an enterprise. If each unit creates its own concept definition, then redundant and inconsistent definitions for the concepts within the enterprise may result. Accordingly, there are challenges to maintaining consistent definitions for concepts within an enterprise that are relevant across domains.

SUMMARY

The following presents a simplified summary in order to provide a basic understanding of aspects described herein. The summary is not an extensive overview of all aspects. It is neither intended to identify key or critical elements nor to delineate the scope of the claims. The following summary merely presents some concepts in a simplified form as a prelude to the description below.

A computer-implemented method of managing an electronic enterprise concept dictionary is provided. An electronic master dictionary may be maintained that corresponds to the enterprise concept dictionary. The master dictionary may include concept entries. The master dictionary may also include concept identifiers respectively associated with the concept entries. The master dictionary may further include one or more concept definitions respectively associated with the concept entries. Electronic local dictionaries may also be maintained. A local dictionary may include one or more of the concept identifiers included in the master dictionary.

In response to a determination that a local dictionary includes a concept identifier corresponding to a concept associated with a modeling component, the modeling component may be associated with the concept identifier. In response to a determination that the local dictionary does not include a concept identifier corresponding to the concept, it may be determined whether the master dictionary includes the concept identifier. If the master dictionary includes the concept identifier, then the concept identifier may be included in the local dictionary and associated with the modeling component. If the master dictionary does not include the concept identifier, then a new concept entry may be created in the master dictionary to obtain a new concept identifier. The new concept identifier may also be included in the local dictionary and associated with the modeling component.

A system for managing an enterprise concept dictionary is also provided. An electronic master dictionary may correspond to the enterprise concept dictionary. As noted above, the electronic master dictionary may include concept entries respectively associated with concept identifiers and one or more concept definitions. Electronic local dictionaries may include one or more of the concept identifiers included in the master dictionary.

A dictionary management module may be in signal communication with the master dictionary and the local dictionaries. The dictionary management module may be configured to query the master dictionary for a concept entry that corresponds to a concept associated with a modeling component and provide a concept identifier if a concept entry is found. The dictionary management module may also be configured to add a new concept entry to the master dictionary and provide a new concept identifier when the master dictionary does not include a concept entry for the concept. A notification module may be in signal communication with the master dictionary and may be configured to automatically provide notification when a concept entry is added or updated in the master dictionary.

A non-transitory computer-readable medium is also provided. The non-transitory computer-readable medium may include instructions that, when executed by a processor, carry out one or more of the steps identified above and discussed in further detail below.

A method may comprise determining, by a computing device, that an application uses a first concept name from an application dictionary to describe an event in response to a determination that the event occurs at the application. An entry for the event may be added to a data log for the application. The entry may include the first concept name from the application dictionary. The method may additionally comprise generating a mapping of the first concept name from the application dictionary to a second concept name from a domain dictionary. The domain dictionary may be different from the application dictionary.

Generating the mapping, as discussed above, may comprise generating a mapping file that identifies the domain dictionary, the first concept name from the application dictionary, and a concept identifier for the event. In some aspects, the mapping file might not identify the second concept name from the domain dictionary. The mapping file may also comprise a JavaScript Object Notation for Linked Data (JSON-LD) file. The domain dictionary may also comprise a JSON-LD file. In some aspects, the domain dictionary may comprise a plurality of concept names including the second concept name. Each of the plurality of concept names may correspond to a concept identifier. Generating the mapping may additionally or alternatively comprises associating the first concept name from the application dictionary to a concept identifier, and associating the second concept name from the domain dictionary to the concept identifier.

The method may comprise determining, by the computing device, that the application uses a third concept name from the domain dictionary to describe the second event in response to a determination that a second event occurs at the application. A second entry for the second event may be added to the data log for the application, where the second entry includes the third concept name from the domain dictionary. The data log may also be sent to a data log analysis system capable of accessing the domain dictionary.

A non-transitory computer-readable medium is also provided. The non-transitory computer-readable medium may store instructions that, when read by a computing device, cause the computing device to perform one or more of the steps identified above and discussed in further detail below.

An apparatus comprising a processor and memory is also provided. The memory may store computer-executable instructions that, when executed by the processor, cause the apparatus to perform one or more of the steps identified above and discussed in further detail below.

The details of these and other embodiments of the disclosure are set forth in the accompanying drawings and description below. Other features and advantages of aspects of the disclosure will be apparent from the description and drawings.

BRIEF DESCRIPTION OF THE DRAWINGS

Aspects described herein are illustrated by way of example and are not limited by the accompanying figures in which like reference numerals indicate similar elements and in which.

DETAILED DESCRIPTION

The disclosure provides systems and methods for maintaining consistent concept definitions across domains/ontologies within an enterprise. An enterprise may be, for example, a corporation having multiple business units operating within respective business domains. While the disclosures below proceed within the context of corporate enterprises and their associated business units and business domains, it will be appreciated that aspects of the disclosure are applicable to additional or alternative enterprises.

An enterprise may be associated with various enterprise domains such as, for example, a risk domain, a business process domain, a data domain, a security domain, a services domain, an application domain, and other domains. Enterprise engineering may involve identifying and defining components to model aspects of the various domains. Such components may include, for example, entities, attributes, relationships, and the like. As such, these components may be referred to as modeling components. During the domain modeling process, domain dictionaries may be created and updated to define and describe the concepts associated with the components used to model the domain. The domain dictionaries may thus include entries for the concepts that are associated with the components used to model the domain and one or more definitions for those concepts. Accordingly, an entry for a concept 104 may include a main definition approved for use by the various domains of the enterprise as well as a list of alternative definitions for the concept. A concept associated with a modeling component may be a single term or a phrase.

In some circumstances, the concepts may be relevant across domains, i.e., may be relevant to multiple domains within the enterprise. Accordingly, the concepts may be applicable to modeling components from different domains. As noted above, redundant and inconsistent definitions for concepts relevant across domains can result where each domain modeler provides a definition for a concept relevant to multiple domains. Enterprises may thus find it advantageous to maintain a consistent definition for concepts that are relevant to multiple domains. As discussed further below, an enterprise may maintain an enterprise concept dictionary defines the concepts relevant to the domains of the enterprise. In this way, the enterprise concept dictionary provides a consistent definition for concepts that each domain may leverage when modeling the domain.

Figure 1:
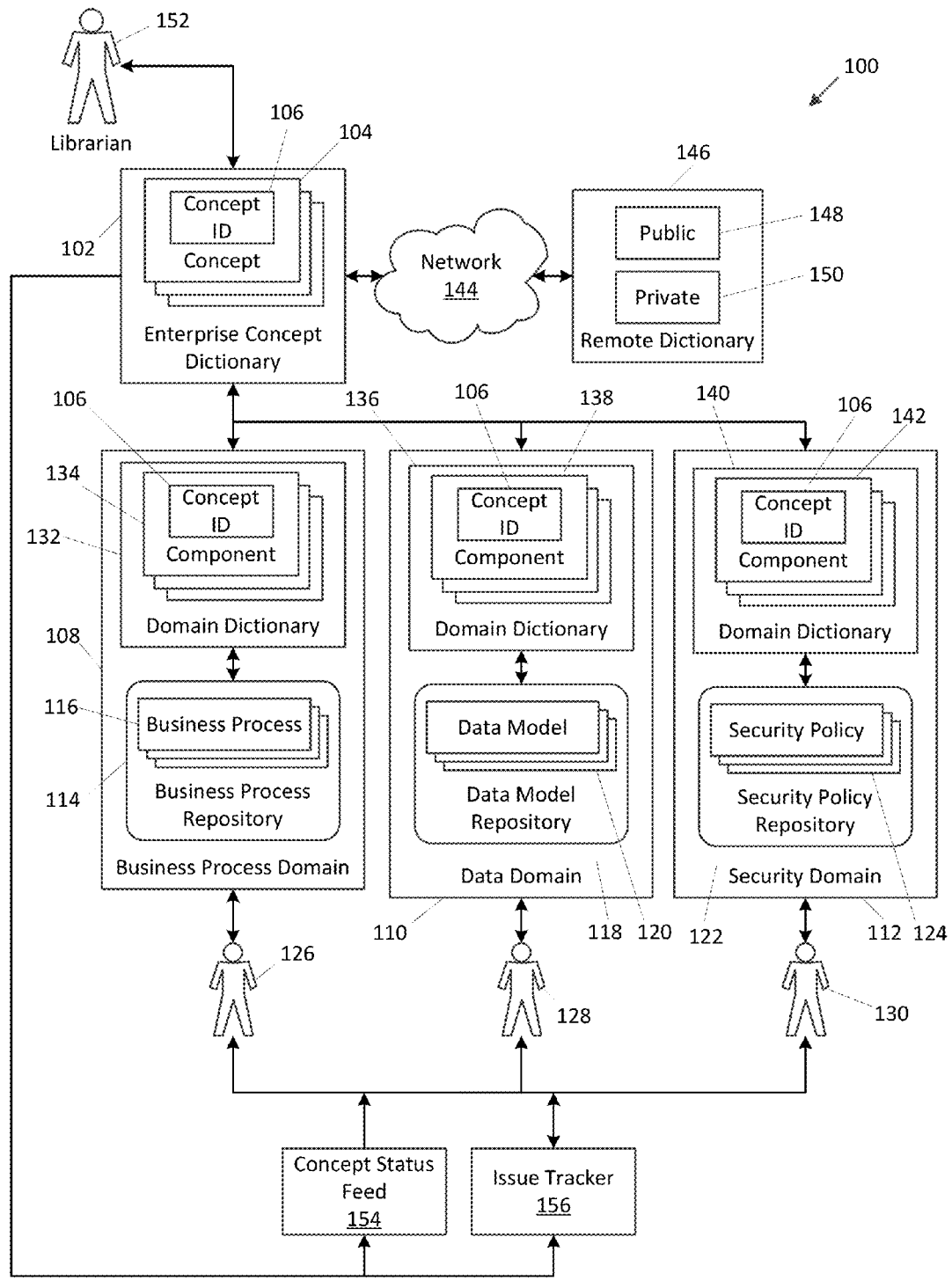
FIG. 1 is an example of an implementation of an enterprise concept definition management system.

Referring to FIG. 1, an implementation of an enterprise concept definition management system 100 is shown. The system 100 includes an electronic enterprise concept dictionary 102 entries for enterprise concepts 104 and corresponding definitions that define and describe the semantic meanings of the concepts. Entries for the concepts 104 in the enterprise concept dictionary 102 may include metadata related to the concepts including, for example, a concept identifier 106 ("concept ID"), a concept name, and one or more concept definitions. The entries for the concepts 104 may include additional or alternative types of metadata. Entries for the concepts 104 in the enterprise concept dictionary 102 may also include, for example, synonyms, pseudonyms, sources, and the like. For corporate enterprises, the enterprise concept dictionary 102 may also be referred to as a corporate concept dictionary. In this regard, the corporate concept dictionary serves as a repository of reference material for concepts relevant across the domains of the corporate enterprise.

An enterprise may include various domains, and in the corporate context, a corporate enterprise may include various business domains. As shown by way of example in FIG. 1, business domains of a corporate enterprise may include a business process domain 108, a data domain 110, and a security domain 112. The domains may include various repositories to store domain models created for the domains. For example, the business domain 108 may include a business process repository 114 for storing business processes 116 modeled within the business domain; the data domain 110 may include a data model repository 118 for storing data models 120 created within the data domain; and the security domain 112 may include a security policy repository 122 for storing security polices 124 created within the security domain. One or more individuals within the enterprise may create and manage the models for the domains of the enterprise, e.g., a business process modeler 126 may model the business processes 116 of the enterprise, a data modeler 128 may model the data models 120 of the enterprise, and a security policy modeler 130 may model the security policies 124 of the enterprise. In this regard, such individuals may be referred to as domain modelers. The domain modelers 126, 128, 130 may be, for example, employees of a corporate enterprise tasked with managing the respective domains 108, 110, 112.

As noted above, domain modelers may utilize various modeling components to model the domain. Domain modelers may maintain their own domain dictionaries that define and describe the modeling components and the concepts associated with the modeling components. For example, a business process modeler 126 may maintain a business process domain dictionary 132 that includes entries for business process concepts 134; a data modeler 128 may maintain a data domain dictionary 136 that includes entries for data concepts 138; and a security policy modeler may maintain a security policy domain dictionary 140 that includes entries for security policy concepts 142. Entries in the domain dictionary may also include metadata, e.g., a concept ID, an component name, an component type, an component category, and the like.

To maintain consistent definitions for concepts across domains, the entries in the domain dictionaries may be linked, related, or otherwise associated with respective entries for concepts 104 in the enterprise concept dictionary 102. As an example, an entry in a domain dictionary may link to a concept 104 in the enterprise concept dictionary 102 via the concept ID 106. That is, both the domain dictionary 132, 136, or 140 and the enterprise concept dictionary 102 may include the concept ID 106 to establish a relationship between the entry in the domain dictionary and the entry in the enterprise concept dictionary. As a result, when the entry in a domain dictionary 132, 136, or 140 is referenced, the domain dictionary may access and retrieve the definition for the concept 104 from the enterprise concept dictionary 102 via the concept ID 106. In this way, the various domain dictionaries 132, 136, and 140 may leverage consistent definitions for concepts 104. Additionally, the enterprise concept dictionary 102 remains independent of and agnostic to any domain modeling components 134, 138, 142 that leverage the definitions for the concept 104 of the enterprise concept dictionary 102.

The corporate concept dictionary 102 thus represents a centralized repository for the definitions of the concepts 104. Accordingly, the enterprise concept dictionary 102 may be referred to as a master dictionary, and a domain dictionary 132, 136, 140 may be referred to as a local dictionary. Furthermore, the enterprise concept dictionary 102 and the domain dictionaries 132, 136, and 140 are electronic dictionaries and thus may be respectively referred to as an electronic master dictionary and electronic local dictionaries. The electronic master dictionary 102 and the electronic local dictionaries 132, 136, 140 may be selectively implemented as, for example, a spreadsheet, a database with corresponding tables and columns, an XML file (eXtensible Markup Language), delimited value lists (e.g., comma-separated, tab-separated), or other types of electronic data stores. Accordingly, the entries in the electronic master dictionary 102 and the electronic local dictionaries 132, 136, and 140 may be, for example, database records, line items, spreadsheet rows, and the like. The concept identifier 106 may be a unique identifier that uniquely identifies entries for concepts 104 in the electronic master dictionary 102. The concept identifier may be, for example, a text string of alphabetic, numeric, alphanumeric, or symbolic characters as well as combinations thereof. The concept identifier 106 may include multiple sub-parts such as, for example, a source identifier that identifies an entity (e.g., enterprise, organization, corporation) that created the concept, a data identifier that identifies the concept itself, and a version identifier that indicates the concept version. The sub-parts may be separated by a delimiter such as a hash mark (#). As an example, the concept ID 106 may conform to or resemble the format specified by ISO 22745-10. Association between entries in the electronic master dictionary 102 and the electronic local dictionaries 132, 136, and 140 may be established, for example, via primary and foreign keys, via object attributes or properties or a structured file or list, and the like. Furthermore, associating a modeling component 134, 138, or 142 with an entry for a concept 104 in the electronic master dictionary 102 or the electronic local dictionaries 132, 136, and 140 may involve associating the concept ID with, including the concept ID in, or otherwise identifying the concept ID 106 at the modeling component.

Automated tools may also retrieve the definition for a concept 104 defined at the electronic master dictionary 102 using the concept ID 106. Tools that may utilize the concept ID 106 to leverage the concept definitions at the electronic master dictionary 102 may include, for example, identity and access management tools for creating user roles, managing access requirements, and reviewing access rights. Notably, such tools may include logging mechanisms that may include the concept IDs 106 in log entries to accurately describe access transactions. As a result, definitions for various information included in the log records is readily available during security information and event management (SIEM) analyses. Other types of tools, services, and resources utilized by an enterprise may similarly leverage concept definitions for concepts 104 using the concept ID 106.

The system 100 may be in signal communication via a computer network 144 with a publicly accessible repository 146 of concept definitions, e.g., a remote concept dictionary. The remote dictionary may be publicly available via the network 144 and may thus be referred to as a public dictionary. It will be appreciated that the remote dictionary may also be a remote private dictionary that is not publicly available. The remote concept dictionary 146 may include concept definitions published by national and international bodies, standards organizations, or private entities such as corporations. In this regard, the remote concept dictionary 146 may include a public namespace 148 and a private namespace 150 for concept definitions. An enterprise may, in some circumstances, seek to leverage the definitions published by the publicly accessible remote concept dictionary 146 when defining the concepts 104 in the enterprise concept dictionary 102. The enterprise may also publish its own definitions for concepts 104 defined in its enterprise concept dictionary 102 such that other entities may leverage those definitions from the remote concept dictionary 146. One example of a publicly accessible remote concept dictionary 146 is the Open Technical Dictionary (eOTD) maintained by the Electronic Commerce Code Management Association (ECCMA).

The enterprise concept dictionary 102 may be managed by an individual 152 within the enterprise. Such an individual 152 may be responsible for reviewing, validating, and updating entries in the enterprise concept dictionary 102. The individual 152 that manages the enterprise concept dictionary 102 may be referred to as the librarian. The librarian 152 may ensure data quality at the enterprise concept dictionary 102 by enforcing various standards for entries included in the enterprise concept dictionary. In some example embodiments, the system may be configured to enforce some of the standards automatically as discussed further below. The librarian 152 may monitor entries in the enterprise concept dictionary 102, e.g., the definitions proposed by domain modelers for new concepts 104. The librarian 152 may update the definitions or other metadata for the concept or, additionally or alternatively, request that the domain modelers update the entries. For example, the librarian 152 may identify a preferred definition update the entry for the concept to include the preferred definition. In some instances, the librarian 152 may determine that a definition from the publicly accessible remote concept dictionary 146 is preferred and leverage the definition provided by the remote concept dictionary. The librarian may retrieve the definition from the remote concept dictionary 146 or, additionally or alternatively, link to the definition at the remote concept dictionary via the concept ID 106.

As noted above, the librarian 152 may monitor new entries for concepts 104 added to the enterprise concept dictionary 102. The librarian 152 may review the information provided for the new entry and accept or reject the new entry. Entries for concepts 104 in the enterprise concept dictionary 102 may include a status, e.g., pending, approved, rejected, incomplete, and deprecated. A concept status feed 154 may be in signal communication with the enterprise concept dictionary 102 to notify individuals of the concept status and other information relating to the concept 104, e.g., updates to the concept. Individuals within the enterprise (e.g., domain modelers) may subscribe to concepts 104 of the enterprise concept dictionary 102. The concept status feed 154 may thus provide notifications via a feed reader (not shown) of any updates to concepts 104 including, e.g., changes to the concept status, definition, or metadata. In this way, individuals within the enterprise may advantageously monitor any concepts 104 of interest.

In addition to a concept status feed 154, the concept definition management system may include an issue tracker 156 for managing the process of revising concept definitions. The issue tracker 156 may also be referred to as an issue tracking system or incident ticket system. As discussed further below, issue tickets may be created at the issue tracking system and assigned to individuals within the enterprise. The issue ticket may indicate, for example, the need to update information for a concept 104 at the enterprise concept dictionary 102, e.g., provide a revised definition, provide information associated with the concept, and so forth. The issue tracker 155 thus tracks the progress of resolving an issue and may notify individuals of such progress.

Figure 2:
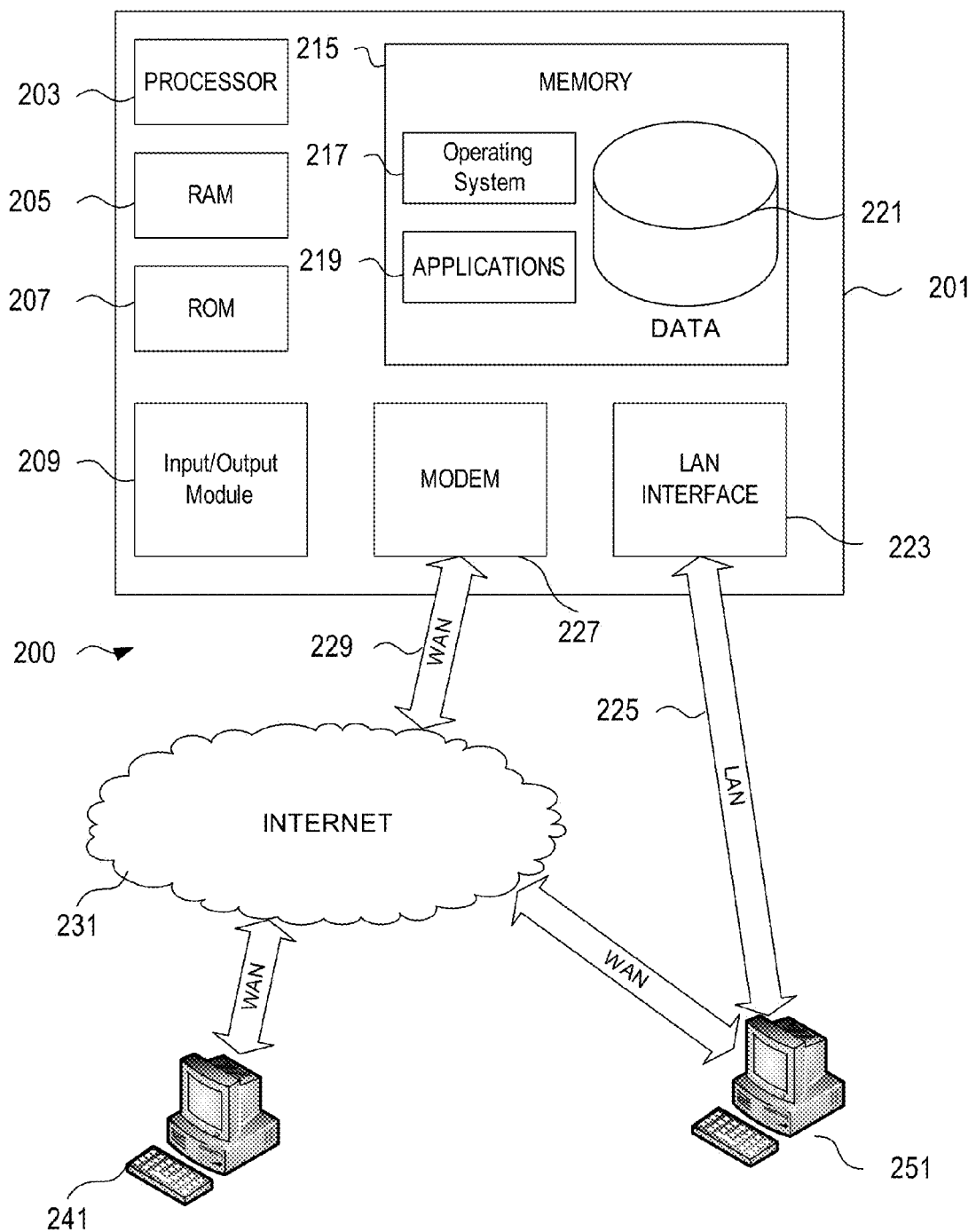
FIG. 2 is a block diagram of a system that may be used according to one or more example embodiments of the disclosure.

FIG. 2 illustrates a block diagram of an enterprise concept definition management module/device 201 (e.g., a computer server) in an enterprise concept definition management system 200 that may be used according to an illustrative embodiment of the disclosure. The device 201 may have a processor 203 for controlling overall operation of the enterprise concept definition management module 201 and its associated components, including RAM 205, ROM 207, input/output (I/O) module 209, and memory 215.

I/O 209 may include a microphone, keypad, touch screen, and/or stylus through which a user of the enhanced backup and retention management module 201 may provide input, and may also include one or more of a speaker for providing audio output and a video display device for providing textual, audiovisual and/or graphical output. Software may be stored within memory 215 and/or storage to provide instructions to processor 203 for enabling device 201 to perform various functions. For example, memory 215 may store software used by the device 201, such as an operating system 217, application programs 219, and an associated database 221. Processor 403 and its associated components may allow the device 401 to run a series of computer-readable instructions to manage enterprise concept definitions.

The server 401 may operate in a networked environment supporting connections to one or more remote computers, such as terminals 241 and 251. The terminals 241 and 251 may be personal computers or servers that include many or all of the elements described above relative to the computing device 201. The network connections depicted in FIG. 2 include a local area network (LAN) 225 and a wide area network (WAN) 229, but may also include other networks. When used in a LAN networking environment, the server 201 is connected to the LAN 225 through a network interface or adapter 223. When used in a WAN networking environment, the server 201 may include a modem 227 or other means for establishing communications over the WAN 229, such as the Internet 231. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 219 used by the enterprise concept definition management module 201 according to an illustrative embodiment of the disclosure may include computer executable instructions for invoking functionality related to managing enterprise concept definitions. Enterprise concept definition management module 201 and/or terminals 241 or 251 may also be mobile terminals, such as smart phones, personal digital assistants (PDAs), and the like including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 3:
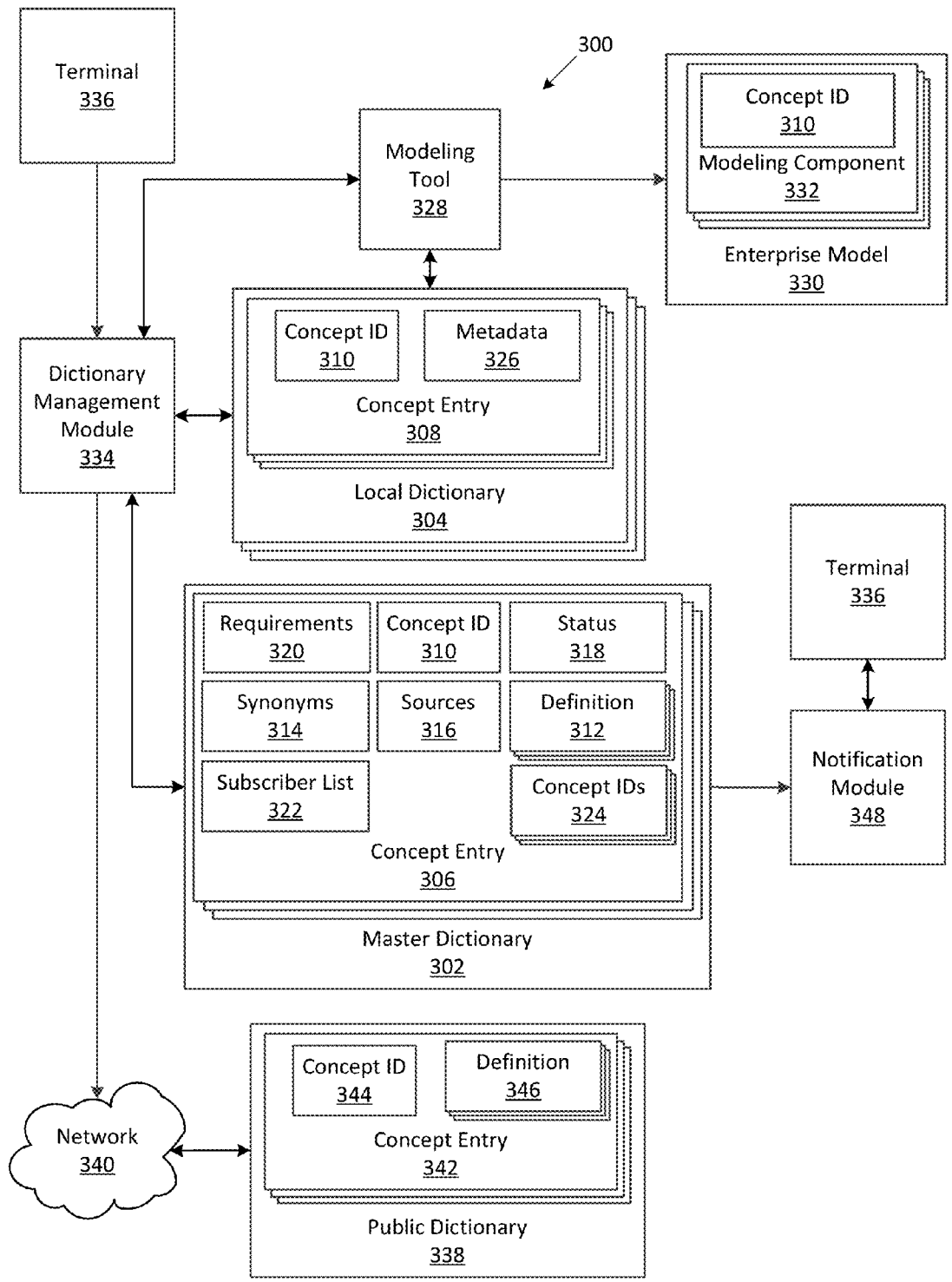
FIG. 3 is a block diagram of a system for managing an electronic enterprise concept dictionary.

Referring to FIG. 3, an example of an implementation of a system 300 for managing an enterprise concept dictionary is shown. As discussed above, the system may include an electronic master dictionary 302 and one or more electronic local dictionaries 304. As noted above, the master dictionary may correspond to the enterprise concept dictionary for an enterprise and the local dictionaries may respectively correspond to domain dictionaries for the various domains of the enterprise.

The master dictionary 302 and the local dictionary 304 may each include concept entries 306 and 308 for concepts relevant to an enterprise. The concept entries 306 at the master dictionary 302 may include a concept ID 310. The concept ID 310 may be included in one or more concept entries 308 of a local dictionary 304. The concept entries 306 in the master dictionary 302 may include one or more definitions 312. The definitions for a concept entry 306 at the master dictionary 302 may include, for example, a main definition and one or more alternative definitions. A concept entry 306 at the master dictionary 302 may also include one or more synonyms 314 for the concept, one or more sources 316 for the definitions 312 of the concept, and a status 318 for the concept. A concept entry 306 at the master dictionary may additionally include a data quality specification 320 the concept entry 306 must satisfy. Additionally, a concept entry 306 at the master dictionary may include a list of subscribers 322 as well as one or more concept IDs 324 for other concept entries that are related to the concept.

A concept entry 308 at the local dictionary 304 may include metadata 326 for the concept. The metadata 326 may include, for example, a concept name, type, and category. It will be appreciated that, in some example embodiments, the master dictionary 302 may include the metadata 326. As seen in FIG. 3 and as explained above, concept entries 308 in the local dictionary 304 may be linked to concept entries 306 in the master dictionary 302 via the concept ID 310. In this way, the local dictionary 304 may leverage the definitions 312 for a concept from the master dictionary 302, and the master dictionary may provide consistent definitions to various domains of an enterprise.

A domain modeler may utilize a modeling tool 328 to develop and enterprise model 330 for a domain of the enterprise. A modeling tool may be, for example, commercially available tools to develop database schemas, design software systems, model business processes and the like. As noted above, such modeling tools 328 may provide various modeling components 332 for modeling the various enterprise domains. A modeling component 332 may include, be associated with, or otherwise identify a concept ID 310 such that a definition for the concept associated with the modeling component may be retrieved from the master dictionary 302.

The system 300 may also include a dictionary management module 334 in signal communication with the master dictionary 302 and the local dictionaries 304. The dictionary management module 334 may be a software application, service, or process (or set of software applications, services, and processes) configured to facilitate the process of managing the respective concept entries 306 and 308 at the master dictionary 302 and the local dictionaries 304. For example, the dictionary management module 334 may be configured to: automatically search a local dictionary for a concept; automatically search the master dictionary for a concept; provide new concept IDs 310 for new concept entries 306 or 308; facilitate creating, reviewing, and updating respective concept entries; and facilitate validation of new concept entries. These processes will be discussed in further detail below. The dictionary management module may provide various user interface screens at a terminal 336 that enable a domain modeler or a librarian to add, update, and review concept entries 306 or 308 at the master dictionary 302 or the local dictionaries 304. Accordingly, the dictionary management module may be implemented as a web-enabled interface, standalone desktop application, mobile application, and the like.

As seen in FIG. 3, the dictionary management module may be in signal communication with a public dictionary 338 via a network 340. As mentioned above, the public dictionary may also include concept entries 342 having a concept ID 344 and one or more definitions 346 for the concept. As discussed further below, the dictionary management module 334 may be configured to automatically initiate a search of the public dictionary 338 for a concept associated with a concept entry 306 at the master dictionary 302.

The system 300 may also include a notification module 348 configured to provide notifications relating to the respective concept entries 306 and 308 at the master dictionary 302 and the local dictionaries 304. The notification module 348 may be configured to monitor the master dictionary 302 and the local dictionaries 304 and provide notifications in response to events occurring at the master dictionary or a local dictionary, e.g., in response to creation of or updates to concept entries 306 or 308. Such notifications may include for example: a notification that a new concept entry 306 has been added to the master dictionary 302; a notification that a concept entry has been updated; a notification that a concept status 318 has changed; and a notification of a task to complete for a concept entry. It will be appreciated with the benefit of this disclosure that the notification module may provide additional or alternative notifications. In some example embodiments, the master dictionary may be configured to broadcast changes to the notification module, which may in turn provide the notifications to the individuals.

The notification module may include, for example, an email messaging system, an issue tracking system, a web feed system (e.g., RSS), and combinations thereof. Notifications may also be provided at one or more of the interface displays provided by the dictionary management module. Accordingly, notifications may be provided as email messages, issue tickets, content items of a web feed, messages at an interface display, and combinations of such. It will be appreciated that the notification module may provide additional or alternative types of notifications using additional or alternative approaches. Such notifications may be presented to a librarian, domain modeler, or other individual of the enterprise at a terminal 336.

Regarding the web feed, the system may, in some example implementations, publish multiple web feeds. As an example, the system may publish a main web feed that provides notification of changes to all concept entries in the master dictionary, a set of web feeds that provide notification of changes to concept entries of a particular concept type or related to a particular domain (e.g., a security policy web feed, a risk policy web feed, a business process domain web feed, a data domain web feed, and the like), or, additionally or alternatively, individual web feeds for each concept entry in the master dictionary. Individual may subscribe to one or more of the web feeds, e.g., the web feeds for concepts, concept types, or domains the individual is interested in. Subscribers may view the web feeds at a web feed reader or web feed aggregator.

Figure 4:
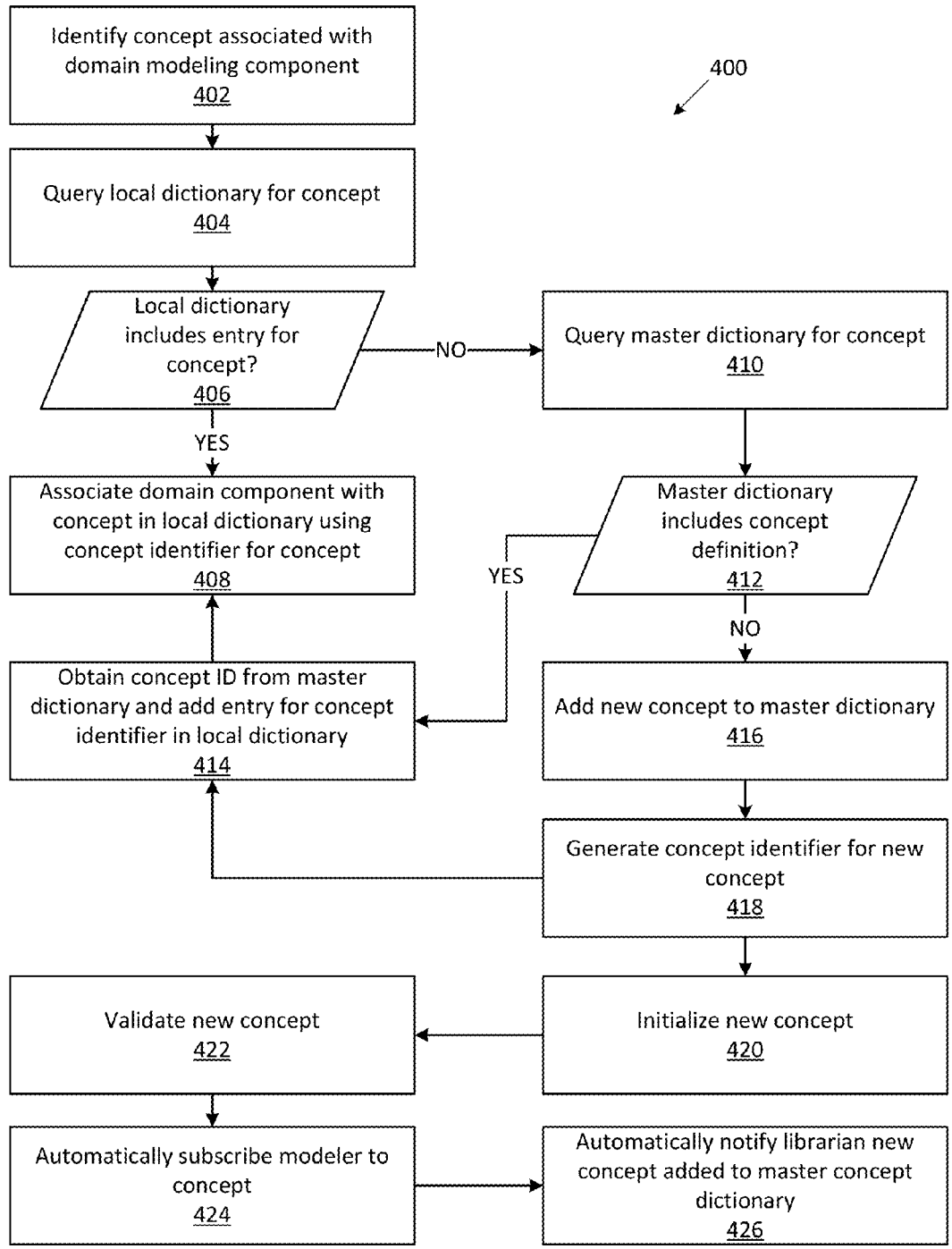
FIG. 4 is a flowchart of example method steps for adding new entries in an enterprise concept dictionary.

Referring to FIG. 4, a flowchart 400 of example method steps for adding new entries in the enterprise concept dictionary is shown. A domain modeler may identify a concept associated with a modeling component for a domain (block 402). The domain modeler may then determine whether a definition for the concept exists by querying the local dictionary for the concept (block 404). The domain modeler may, for example, provide the name of the concept to the dictionary management module, which may search the local dictionary for a concept entry corresponding to the concept name provided. If the local dictionary includes a concept entry for the concept (block 406), then the dictionary management module may provide the concept ID of the concept entry such that the domain modeling component may be associated with the concept entry at the local dictionary corresponding to the concept ID (block 408). As noted above the concept ID may be associated with, included in, or otherwise identified at the modeling component. If the local dictionary does not include a concept entry for the concept (block 406), then the dictionary management module may automatically search the master dictionary for a concept entry provided (block 410). If the master dictionary includes a concept entry for the concept (block 412), then the dictionary management module may obtain the concept ID from the master dictionary and add an entry in the local dictionary for the concept (block 414). The dictionary management module may configure the new concept entry in the local dictionary to include the concept ID for the concept such that the new concept entry at the local dictionary is associated with the concept entry for the concept at the master dictionary. The domain modeling component may in turn be configured to include or identify the concept ID such that the domain modeling component is associated with the concept entry at the local dictionary corresponding to the concept ID (block 408).

If the master dictionary does not include a concept entry corresponding to the concept (block 412), then the domain modeler may add a new concept entry to the master dictionary (e.g., a master concept database record) for the concept (block 416). Upon creation of the new concept entry, the dictionary management module may generate a new concept ID for the new concept entry (block 418). The domain modeler may then initialize the new concept entry (block 420) by providing, e.g., a concept name and a proposed definition. Additionally, initialization of the new concept entry may include setting the status of the new concept entry to "pending" to indicate that the new concept entry has not yet been reviewed and approved. The dictionary management module may facilitate creation and configuration of the new concept entry at the master dictionary by providing one or more display interfaces at which the domain modeler may provide the concept information. After creation of the new concept entry in the master dictionary, the dictionary management module may obtain the new concept ID and add a new entry for the concept in the local dictionary (e.g. a local concept database record) that includes the new concept ID (block 414). The new concept ID is thus available to the domain modeler for use with the domain modeling component.

In some example embodiments, the dictionary management module may be configured to validate new concept entries upon creation (block 422). Validating a new concept entry may include, for example, ensuring that the new concept entry includes an initial proposed definition, ensuring that the new concept entry satisfies any data quality specifications for the concept type, and the like. Validating new concept entries will be discussed in further detail below. Additionally, in some example embodiments, the dictionary management module may automatically subscribe the domain modeler to the new concept entry (block 424) such that a notification module may notify the domain modeler of any changes or updates to the concept entry.

The notification module may determine that a new concept entry has been added to the master dictionary and automatically notify a librarian that the domain modeler has added the new concept entry (block 426). As noted above, the notification module may notify the librarian via an email message, an issue ticket, or a message displayed at a display interface. For example, the display interface may include a list of all new concepts that domain modelers of an enterprise have added. The librarian may thus proceed through the list review the new concept entries and either approve or reject the new concept entries. As discussed further below, the librarian may update concept entries during review or may request that a domain modeler to update the concept entry.

Accordingly, it will be appreciated that the enterprise dictionary management system permits domain modelers to create new concept entries as needed during domain modeling activities. The system permits domain modelers to expand an enterprise concept dictionary with new concepts as needed and provides the domain modelers with concept IDs that can be used in the domain model upon creation of the concept entry. In this way, domain modelers are not hindered in their domain modeling efforts by waiting for approval of the new concept entries. Instead, review of the new concept entries may advantageously take place simultaneously with the use of such concept entries at the domain modeling level. Additionally, any updates to the concept entries will be automatically reflected at the domain model via the concept ID that references and links to the concept entry at the enterprise concept dictionary.

Figure 5:
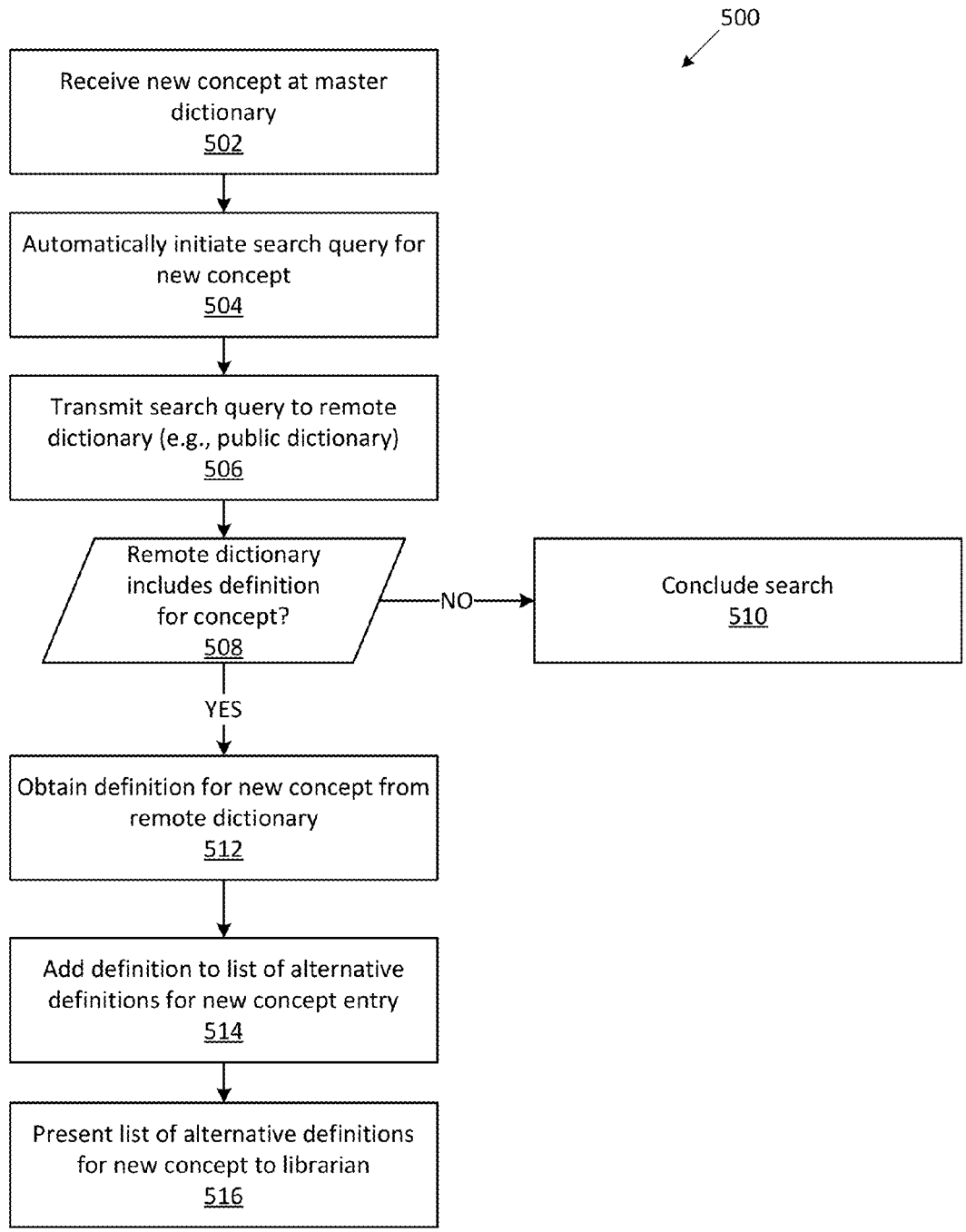
FIG. 5 is a flowchart of example method steps for automatically performing a search based on a new concept entry in an enterprise concept dictionary.

In some example implementations the dictionary management module may be configured to automatically search one or more remote dictionaries for definitions of a new concept added to the master dictionary of an enterprise. FIG. 5 is a flowchart 500 of example method steps for automatically performing a search based on a new concept entry in the enterprise concept dictionary. A new concept entry may be added to the master dictionary (block 502). During the creation process (e.g., during initialization) the dictionary management module may automatically initiate a search query for the concept (block 504). The search query may include, e.g., the concept name and may conform to a format specified by an application programming interface (API) provided by a remote dictionary, e.g., a public dictionary accessible via a network.

The dictionary management module may transmit the search query to the remote dictionary, e.g., via the network (block 506). If the remote dictionary does not include any definitions for the concept (block 508), then the dictionary management module may conclude the search (block 510). If, however, the remote dictionary does include a definition for the concept (block 508), then the remote dictionary may provide one or more definitions of the concept to the dictionary management module (block 512). The remote dictionary may provide the definitions via the network in, e.g., one or more responses to the search query. Upon receipt of the definitions from the remote dictionary, the dictionary management module may add one or more of the definitions received to the list of alternative definitions of the new concept entry in the master dictionary (block 514). The list of alternative definitions, which may include the definitions received from the remote dictionary, may thus be presented to the librarian during the review of the new concept entry (block 516).

Figure 6:
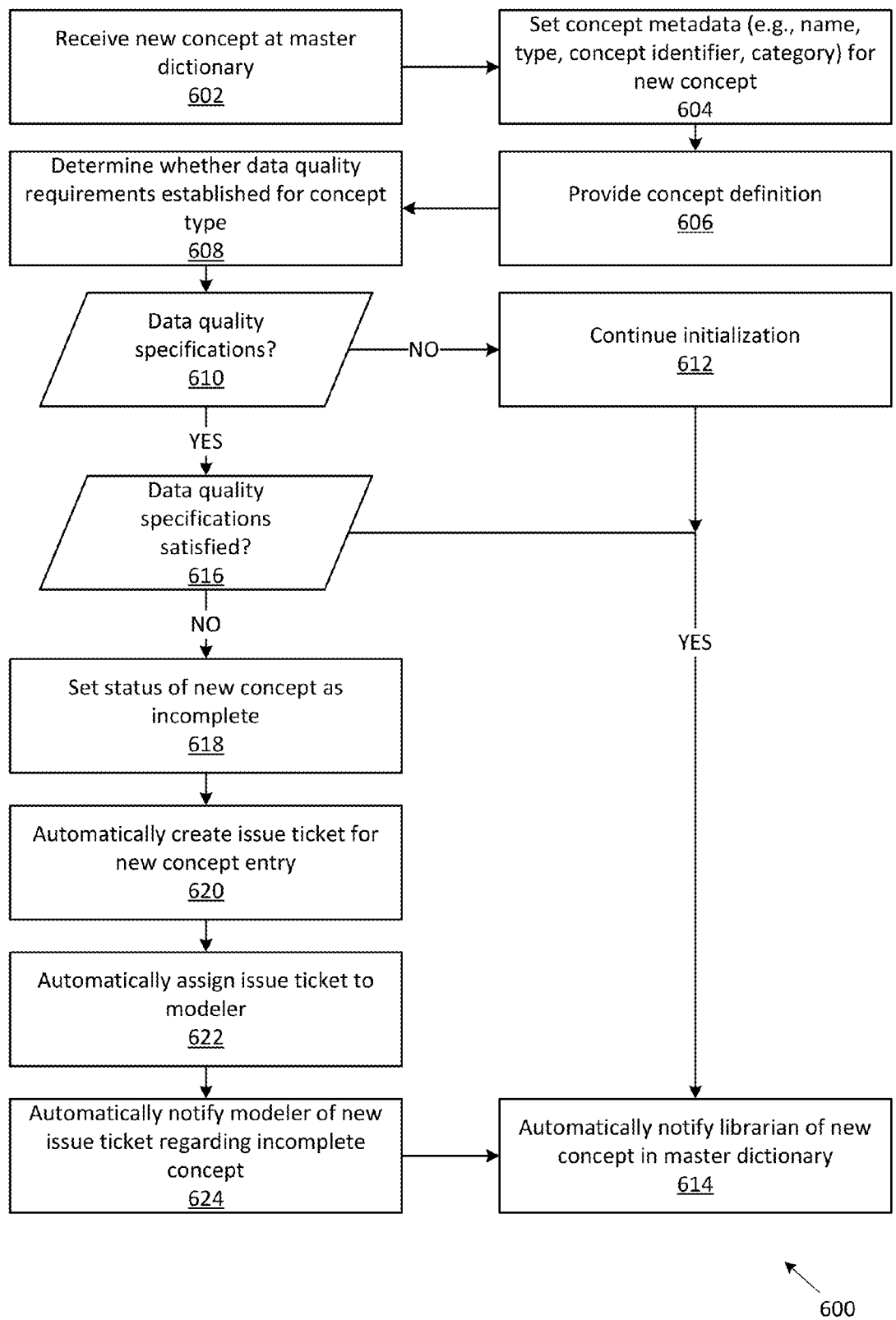
FIG. 6 is a flowchart of example method steps for validating a new concept entry in an enterprise concept dictionary.

As noted above, the dictionary management module may be configured to validate a new concept entry upon creation. FIG. 6 is a flowchart 600 of example method steps for validating a new concept entry in the master dictionary. A new concept entry may be created at the master dictionary (block 602). A domain modeler may provide concept information for the concept, e.g., metadata such as the concept name, a concept type, and a concept type (block 604). A new concept identifier may be generated and set for the new concept entry.

The domain modeler may also provide an initial proposed concept definition for the new concept entry (block 606).

As noted above, validating the new concept entry may include determining whether one or more data quality specifications are satisfied. In some example embodiments, concept entries may be associated with or specify a particular concept type. The concept type may in turn be associated with one or more data quality specifications. Accordingly, when a new concept entry is added to the master dictionary, the dictionary management module may determine whether the concept type of the new concept entry is associated with or includes data quality specifications (block 608). If data quality specifications are not specified for the concept type of the new concept entry (block 610), then the dictionary management module may continue with initialization (block 612), and the notification module may provide notification of the new concept entry once initialization is complete (block 614).

If data quality specifications are specified for the concept type of the new concept entry (block 610), then the dictionary management module may determine whether the data quality specifications are satisfied (block 616). Data quality specifications may be based on external governance or industry standards or, additionally or alternatively, on internal enterprise standards. Data quality specifications may specify, for example, certain types of information that the concept entry in the master dictionary must include. For example, a general data quality specification may specify that a concept entry at the master dictionary must include at least one definition. If, in this example, the dictionary management module determines that a concept entry does not include a definition, the dictionary management module may determine that the concept entry does not satisfy the data quality specifications. Data quality specifications may also specify relationships that should be established between a concept entry of a particular concept type and other concept entries in the master dictionary. As another example, data quality specifications in the business domain may specify that concept entries relating to business processes should be associated with at least one concept entry relating to a job function. Accordingly, if, in this example, the dictionary management module determines that a business process-type concept entry is not associated with at least one job function-type concept entry, then the dictionary management module may determine that the concept entry does not satisfy the data quality specifications associated with the business process concept type. It will be appreciated that additional or alternative data quality specifications may be selectively employed.

If the dictionary management module determines that a new concept entry does not satisfy one or more associated data quality specifications (block 616), then the dictionary management module may set the status of the new concept entry as, e.g., "incomplete" (block 618). In some example embodiments, the dictionary management module may be configured to initiate notification to an individual (e.g., a librarian or domain modeler) that the new concept entry is incomplete. As noted above, the notification module may be (or include) an issue tracker. Accordingly, in some example embodiments, the dictionary management module may automatically create a new issue ticket in the issue tracker and identify or otherwise associate the new issue ticket with the new concept entry (block 620). The dictionary management module may also indicate in the new issue ticket one or more tasks that an individual must carry out with respect to the new concept entry, e.g., provide a definition, establish appropriate relationships with other concept entries, and the like. The dictionary management module may automatically assign the issue ticket to an individual responsible for responding to the issue ticket (block 622). The notification module, e.g., the issue tracker may thus provide notification to the individual of the new issue ticket assigned (block 624). As noted above, however, because the new concept entry has been created, the concept entry and corresponding concept ID are thus available as needed for domain modeling efforts. An individual may respond to the issue ticket as desired independently of any domain modeling efforts. It will be appreciated that the individual assigned to the issue ticket may or may not be the individual that created the new concept entry. Once initialization of the new concept entry is finished, whether the new concept entry is complete or incomplete, the notification module may notify the librarian that a new concept entry has been added to the master dictionary (block 614). In some example embodiments, the notification to the librarian may indicate whether the new concept entry is complete or incomplete.

Figure 7:
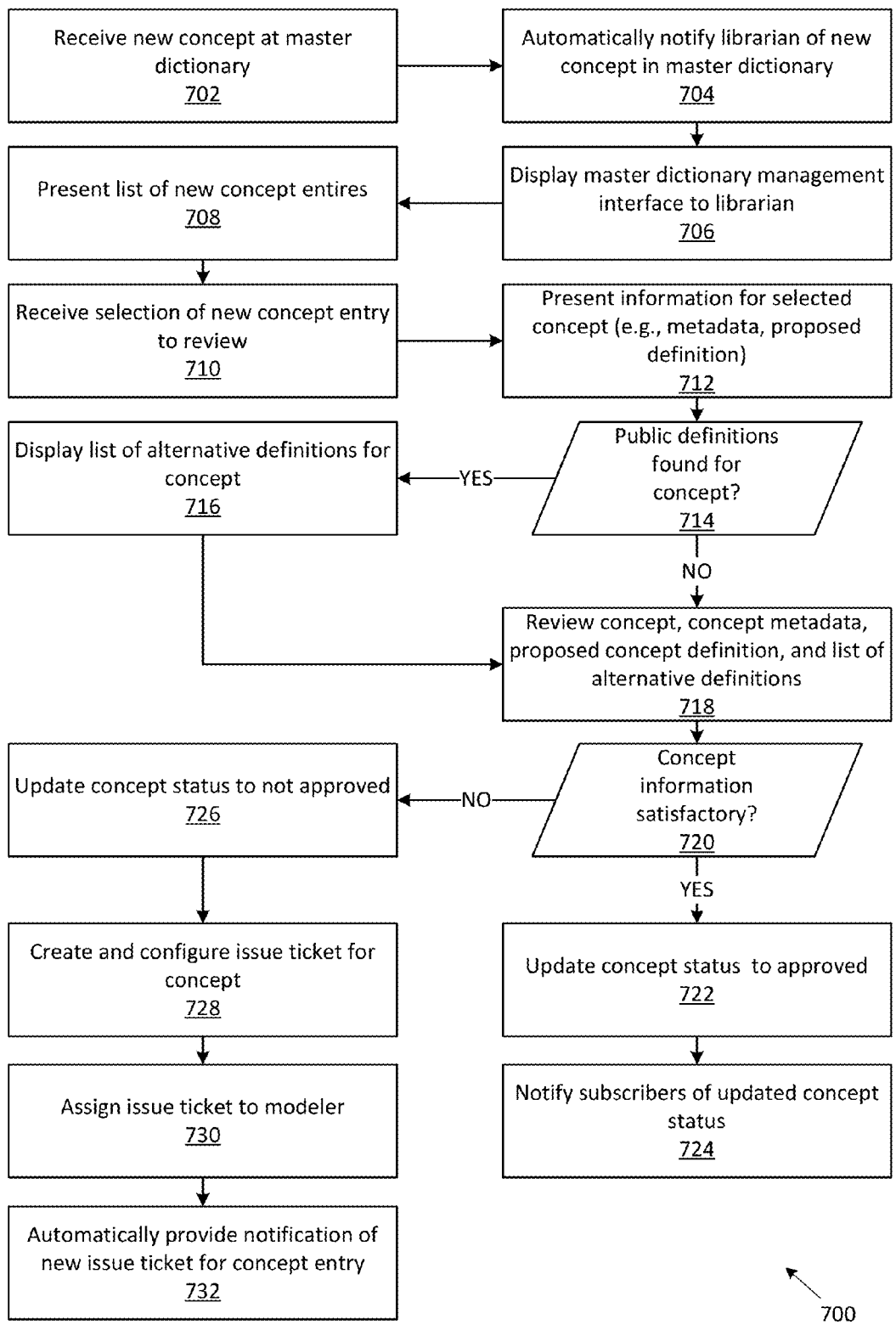
FIG. 7 is a flowchart of example method steps for reviewing a new concept entry in an enterprise concept dictionary.

As also noted above, a librarian may review new concept entries added to the master dictionary. The librarian may review the new concept entries to ensure, for example, that the proposed definition is acceptable for the enterprise. Referring to FIG. 7, a flowchart 700 of example method steps for reviewing a new concept entry in a master dictionary is shown. As shown above, a new concept entry may be added to a master dictionary of an enterprise (block 702), and a notification module may automatically notify a librarian of the new concept entry (block 704). The dictionary management module may present one or more user interface displays to the librarian (e.g., at a web portal or desktop application) that permit the librarian to manage the master dictionary of the enterprise. One of the user display interfaces that the dictionary management module may present to the librarian may be referred to as a master dictionary management interface (block 706).

The master dictionary management interface may provide the librarian with access to the master dictionary of the enterprise. The librarian may select a concept entry at the master dictionary to view the information associated with the selected concept entry, e.g., the concept definition, the list of alternative definitions, the list of sources for the definition, the status of the definition and so forth. The master dictionary management interface may also present a list of recently added concept entries for the librarian to review (block 708). The librarian may select one of the new concept entries (block 710), and the dictionary management module may retrieve and present the information for the selected concept (block 712), e.g., the proposed definition, the concept type, timestamp information indicating when the concept was created, and the domain modeler that created the concept.

As described above, the dictionary management module may be configured to automatically search for public definitions of the concept at a publicly available remote dictionary. If the dictionary management module located any publicly available definitions for the concept (block 714), then the dictionary management module may display a list of alternative definitions for the concept (block 716) for the librarian to consider.

The librarian may review the information for a selected concept entry (block 718) including, for example, the definition, the metadata, the list of alternative definitions. If the librarian considers the concept information to be satisfactory (block 720), then the librarian may update the status of the concept to, e.g., "approved" (block 722). The notification module may detect the change to the status of the concept entry and notify one or more subscribers to the concept entry of the change (block 724). As noted above, a concept entry may include a list of subscribers, which may be, for example, a list of email addresses, a list of employee numbers, or a list of other information used to identify individual that requested to be notified when changes to the concept entry occur. As also noted above, notification may be provided as an email message, an issue ticket, publications to a web feed, and the like.

If the librarian determines that the concept information is not satisfactory (block 720), the librarian may update the concept status to, e.g., "rejected" (block 726). The librarian may then create in issue ticket for the concept entry (block 728) and indicate at the issue ticket why the concept entry was rejected. The librarian may reject the concept entry where, for example, the librarian determines the proposed definition is incomplete or insufficient. The librarian may assign the issue ticket to an individual (block 730) such that the individual is notified the concept entry needs updating. In some examples, the librarian may assign the issue ticket to the domain modeler that originally created the concept entry. The issue tracker may thus provide notification of the new issue ticket for the concept entry (block 732). In this way, the librarian may advantageously manage the master dictionary from a centralized location, delegate tasks to domain modelers where updates are needed to the concept entries in the enterprise concept dictionary, and monitor the progress of such updates as they are addressed.

Figure 8:
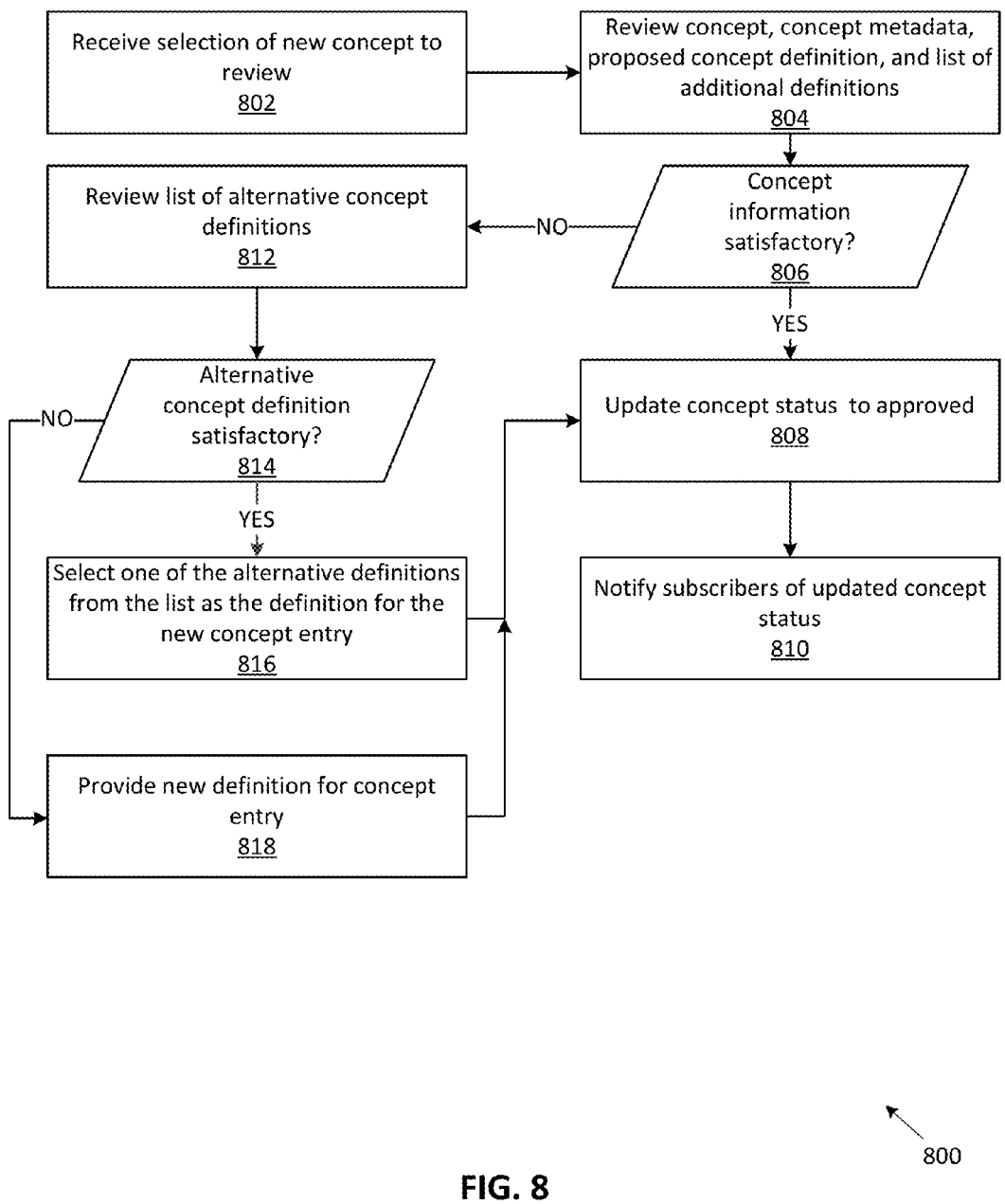
FIG. 8 is a flowchart of example method steps for updating a new concept entry in an enterprise concept dictionary.

In FIG. 8, another flowchart 800 of example method steps for updating a concept entry in a master dictionary is shown. In FIG. 8, the librarian performs the update rather than assigning a task to an individual as shown by way of example in FIG. 7. In FIG. 8, the librarian may select a concept entry of the master dictionary at the master dictionary management interface (block 802), and review the concept information (e.g., the definition) for the selected concept (block 804). If the concept information for the selected concept is satisfactory (block 806), then the librarian may update the concept status to, e.g., "approved" (block 808), and the notification module may notify the subscribers to the concept of the status change (block 810).

If the concept information for the selected concept is not satisfactory (block 808), then the librarian may review the list of alternative definitions for the selected concept (block 812). If one of the alternative definitions for the selected concept is satisfactory (block 814), then the librarian may select a desired alternative definition as the main definition for the concept entry (block 816). If the librarian does not find any of the alternative definitions for the concept satisfactory (block 814), the librarian may provide new definition for the concept entry based on the proposed definition or one or more of the alternative definitions. Having updated the definition for the concept entry, the librarian may update the concept status to, e.g., "approved" (block 808), and the notification module may notify the subscribers to the concept of the new definition (block 810).

Figure 9:
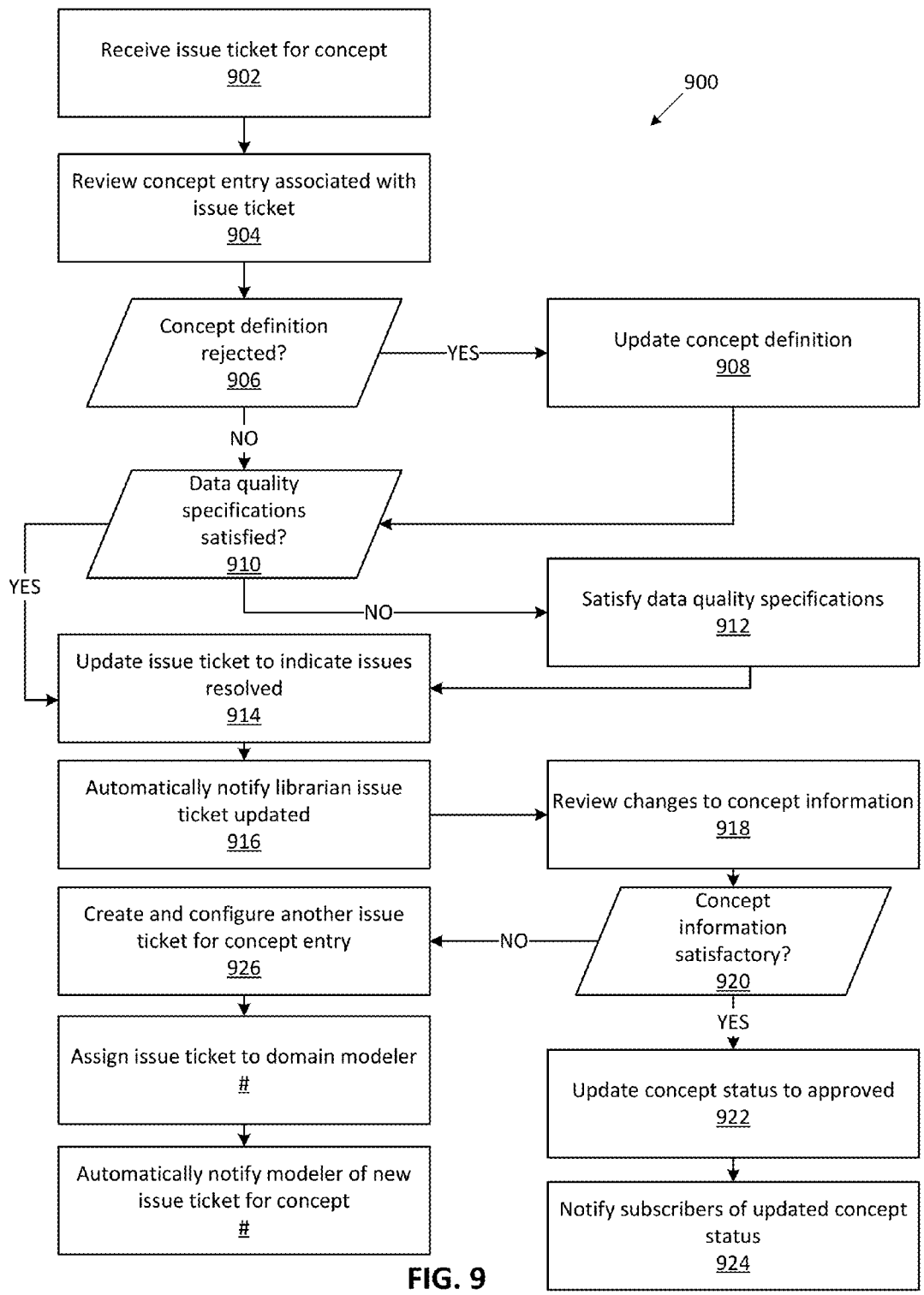
FIG. 9 is a flowchart of example method steps for responding to a notification relating to a concept entry in an enterprise concept dictionary.

In FIG. 9, a flowchart 900 of example method steps for responding to a notification from the notification module is shown. An individual, e.g., a data modeler may receive an issue ticket associated with a concept entry (block 902). As noted above, the issue ticket may identify a task for the data modeler to complete with respect to the concept entry, e.g., revising the definition, completing the definition, or ensuring data quality specifications associated with the concept entry are satisfied. The data modeler may review the concept entry identified by the issue ticket (block 904) including, e.g., the concept definition.

In some examples, the issue ticket may have been created because the librarian rejected the proposed definition for the concept (block 906). Accordingly, the data modeler may revise the concept definition (block 908) in response. In other examples, the issue ticket may have been created because one or more data quality specifications associated with the concept entry is not satisfied (block 910). In response, the data modeler may update the concept entry to satisfy the associated data quality specifications (block 912). Once the data modeler has updated the concept entry to resolve the issues identified in the issue ticket (block 914), the notification module may provide notification to the librarian indicating the concept entry has been updated (block 916).

In response to the notification, the librarian may review the changes (block 918) and determine whether the revised concept information is satisfactory. If the revised concept information is satisfactory (block 920), then the librarian may update the concept status to, e.g., "approved" (block 922), and the notification module may notify the domain modeler of the status change (block 924). If the librarian determines that the revised concept information is not satisfactory (block 920), then the librarian may repeat the process by creating a new issue ticket for the concept entry (block 926), assign the new issue ticket to the domain modeler (block 928), and provide notification to the domain modeler of the new issue ticket via the notification module (block 930).

The dictionary management module may provide a dictionary management interface that domain modelers may use to view the local dictionaries (e.g., the domain dictionaries) as well as the master dictionary (e.g., the enterprise concept dictionary). The dictionary management interface may present the notifications provided by the notification module, e.g., the issue tickets or web feeds. A domain modeler may select a concept entry to review or update, e.g., revise the concept definition, update associated concepts, and so forth.

Figure 10:
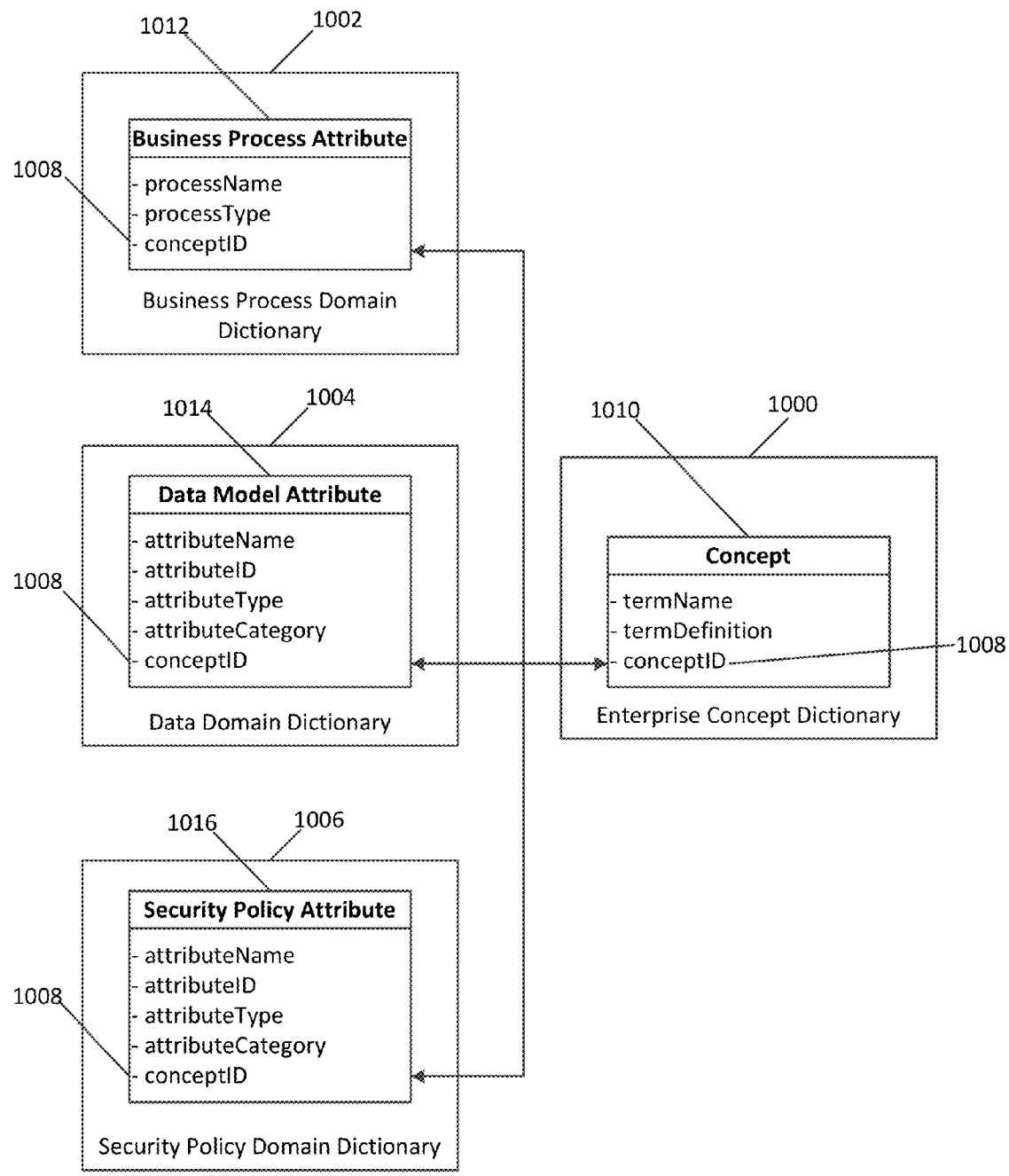
FIG. 10 is a block diagram of an example of an enterprise concept dictionary and examples of various domain dictionaries.

Referring now to FIG. 10, a block diagram of an example of an enterprise concept dictionary 1000 and various domain dictionaries 1002, 1004, 1006 is shown. As seen in FIG. 10, a concept identifier 1008 links a concept 1010 in the enterprise concept dictionary 1000 to attributes 1012, 1014, 1016 in respective domain dictionaries 1002, 1004, 1006. The concept 1010 in the enterprise concept dictionary 1000 may include or otherwise be associated with the concept ID 1008. The respective attributes 1012, 1014, 1016 in each domain dictionary 1002, 1004, 1006 may also include or otherwise be associated with the concept ID 1008. In this way, the concept ID 1008 links domain attributes 1012, 1014, 1016 to a common concept 1010 in the enterprise concept dictionary 1002. The domain attributes 1012, 1014, 1016 may thus reference and leverage the concept definition for the enterprise concept 1010 identified by the concept ID 1008.

In some aspects, a computer-implemented method may comprise maintaining an electronic master dictionary that corresponds to an electronic enterprise concept dictionary and includes one or more concept entries, one or more concept identifiers respectively associated with the one or more concept entries, and one or more concept definitions respectively associated with the one or more concept entries. The method may include maintaining an electronic local dictionary wherein the local dictionary includes one or more of the concept identifiers included in the master dictionary. The method may include determining whether the local dictionary includes a concept identifier corresponding to a concept associated with a modeling component. The method may include associating the modeling component with the concept identifier in response to a determination that the local dictionary includes the concept identifier. The method may include determining whether the master dictionary includes the concept identifier in response to a determination that the local dictionary does not include the concept identifier. The method may include including the concept identifier in the local dictionary and associating the modeling component with the concept identifier in response to a determination that the master dictionary includes the concept identifier. The method may also include creating a new concept entry for the concept in the master dictionary to obtain a new concept identifier, including the new concept identifier in the local dictionary, and associating the modeling component with the new concept identifier in response to a determination that the master dictionary does not include the concept identifier.

In some aspects, the master dictionary may include a status associated with the new concept entry. The method may further include setting the status to indicate that approval of the new concept entry is pending and automatically providing notification that indicates the new concept entry has been created in the master dictionary.

In some aspects, the method may further comprise determining that the new concept entry has not been approved, updating the status associated with the new concept entry to indicate that the new concept entry has not been approved, and automatically providing notification that indicates the new concept entry has not been approved.

In some aspects, the method may further comprise creating a new issue ticket in an issue tracking system wherein the issue ticket indicates one or more reasons that the new concept entry was not approved, associating the issue ticket with the new concept entry, and associating the issue ticket with an individual responsible for updating the new concept entry.

In some aspects, the method may further comprise initiating a search query for the concept associated with the new concept entry at a public dictionary, determining whether the public dictionary includes one or more public definitions for the concept associated with the new concept entry, and including one or more of the public definitions for the concept in the master dictionary such that the one or more public definitions are associated with the new concept entry.

In some aspects, the master dictionary may include a concept definition associated with the new concept entry. The method may further comprise receiving user input corresponding to a selection of one of the public definitions associated with the new concept entry, and setting the concept definition for the new concept entry to the public definition selected.

In some aspects, the method may include updating concept information associated with one of the concept entries included in the master dictionary, and automatically providing notification that the concept entry has been updated.

In some aspects, automatically providing notification that one of the concept entries in the master dictionary has been updated may include publishing update information associated with the concept entry to a web feed associated with the concept entry such that one or more subscribers to the web feed receive the update information.

In some aspects, the master dictionary may include a list of one or more subscribers that subscribe to the concept entry. The step of automatically providing notification that one of the concept entries in the master database has been updated may include creating an issue ticket in an issue tracking system wherein the issue ticket includes the concept information that has been updated, and associating the issue ticket with one or more of the subscribers that subscribe to the concept entry.

In some aspects, the local dictionary includes metadata respectively associated with one or more of the concept identifiers included in the local dictionary, and the metadata may include at least one of a concept name, a concept type, a concept category, and combinations thereof.

In some aspects, a system may comprise an electronic master dictionary that corresponds to an enterprise concept dictionary and includes one or more concept entries, one or more concept identifiers respectively associated with the one or more concept entries, and one or more concept definitions respectively associated with the one or more concept entries. The system may also include an electronic local dictionary, wherein the local dictionary includes one or more of the concept identifiers included in the master dictionary. In some aspects, a dictionary management module may be in signal communication with the master dictionary and the local dictionary. Furthermore, the dictionary management module may be configured to query the master dictionary for a concept entry that corresponds to a concept associated with a modeling component, provide a concept identifier for the concept entry when the master dictionary includes the concept entry for the concept, and add a new concept entry to the master dictionary and provide a new concept identifier associated with the new concept entry when the master dictionary does not include the concept entry for the concept. The system may also comprise a notification module in signal communication with the master dictionary, and the notification module may be configured to automatically provide notification when the new concept entry is added to the master dictionary and when one of the concept entries in the master dictionary is updated.

In some aspects, the master dictionary may be further configured to automatically initiate a search for the concept associated with the new concept entry at a public dictionary, retrieve one or more public definitions for the concept included in the public dictionary, and include the one or more public definitions for the concept in the master dictionary such that the one or more public definitions are associated with the new concept entry.

In some aspects, the master dictionary may include concept entries for a plurality of enterprise domains, the electronic local dictionary may be one of a plurality of electronic local dictionaries, and individual local dictionaries of the plurality of local dictionaries may respectively correspond to one of the enterprise domains of the plurality of enterprise domains.

In some aspects, the system may further comprise a web feed in signal communication with the notification module. The notification module may publish updates to concept information associated with one of the concept entries included in the master dictionary via the web feed.

In some aspects, the system may further comprise an issue tracker in signal communication with the dictionary management module. The dictionary management module may be further configured to create an issue ticket at the issue tracker, associate one of the concept entries included in the master dictionary with the issue ticket, indicate in the issue ticket a task relating to the concept entry, and associate the issue ticket with an individual responsible for completing the task.

In some aspects, a non-transitory computer-readable medium having computer-executable instructions stored thereon that, when executed by a processor, may cause the processor to determine whether a local dictionary database includes a concept identifier corresponding to a concept associated with a modeling component, associate the modeling component with the concept identifier in response to a determination that the local dictionary database the concept identifier, determine whether a master dictionary database includes the concept identifier in response to a determination that the local dictionary database does not include the concept identifier, create a new local concept record for the concept identifier in the local dictionary database and associating the modeling component with the concept identifier in response to a determination that the master dictionary database includes the concept identifier, and create a new master concept record for the concept in the master dictionary database to obtain a new concept identifier, a new local concept record for the new concept identifier in the local dictionary database, and associating the modeling component with the new concept identifier in response to a determination that the master dictionary database does not include the concept identifier.

In some aspects, the concept may be associated with a concept type and wherein the computer-executable instructions, when executed by the processor, may cause the processor to determine whether one or more data quality specifications are associated with the concept type associated with the concept. In response to a determination that one or more data quality requirements are associated with the concept type, the processor may determine whether the new master concept record for the concept satisfies one or more of the data quality specifications. In response to a determination that the new master concept record does not satisfy at least one of the data quality specifications, the processor may set a status associated with the new master concept record to indicate that the new master concept record is incomplete.

In some aspects, the computer-executable instructions, when executed by the processor, may cause the processor to automatically provide notification that the new master concept record is incomplete in response to the determination that the new master concept record does not satisfy at least one of the data quality specifications.

In some aspects, providing notification that the new master concept record is incomplete may include automatically creating an issue ticket in an issue tracking system wherein the issue ticket indicates one or more of the data quality specifications the new master concept record does not satisfy, automatically associating the issue ticket with the new master concept record, and automatically associating the issue ticket with an individual responsible for updating the new master concept record.

In some aspects, the computer-executable instructions, when executed by the processor, may cause the processor to determine that the new master concept record has been updated, and automatically providing notification indicating that the new master concept record has been updated to an individual responsible for reviewing the new master concept record.

Figure 11:
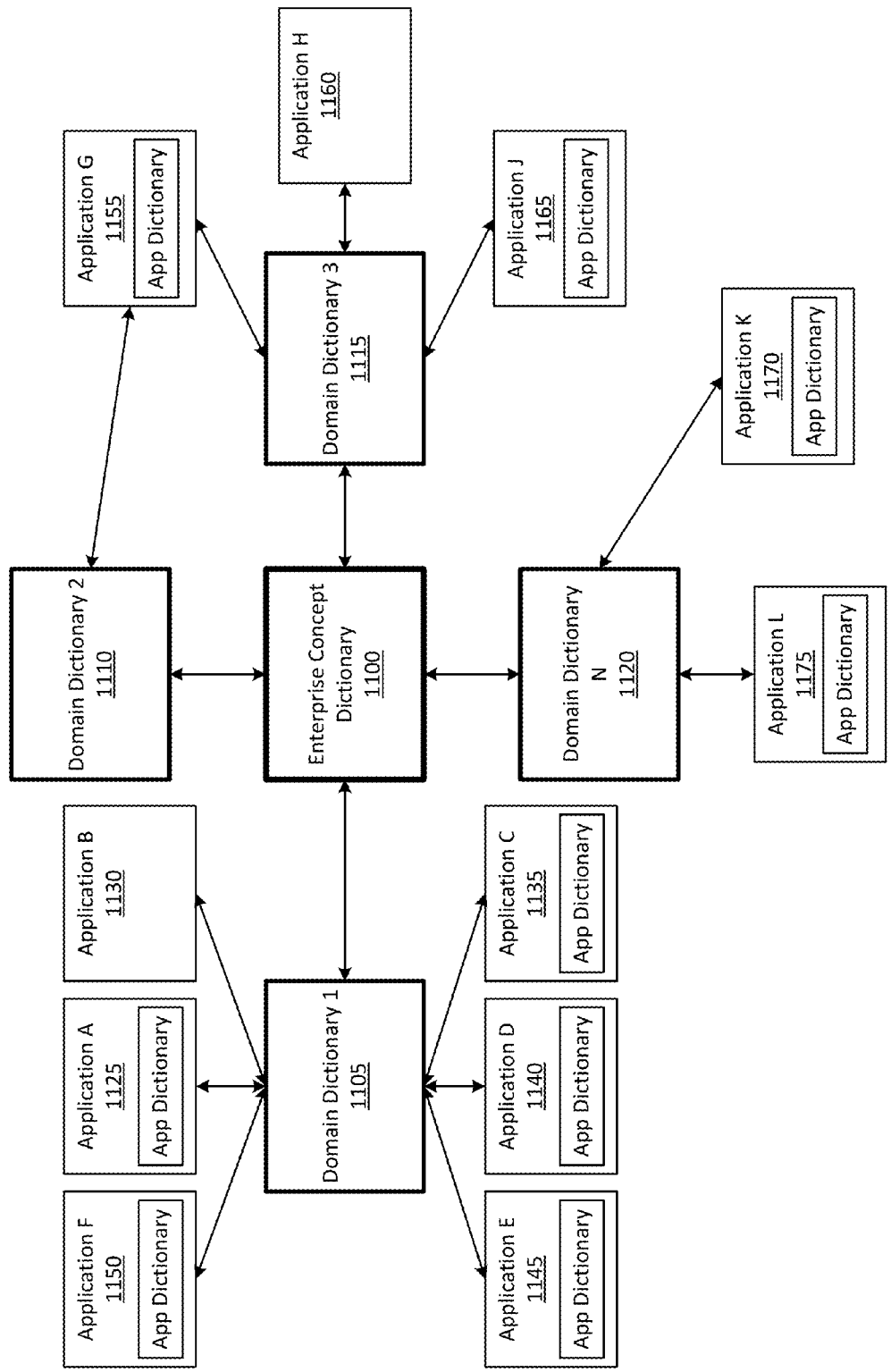
FIG. 11 is a block diagram of an example of an enterprise concept dictionary, examples of various domain dictionaries, and examples of various applications.

FIG. 11 is a block diagram of an example of an enterprise concept dictionary, examples of various domain dictionaries, and examples of various applications. In some aspects, the enterprise concept dictionary 1100 may be the enterprise concept dictionary previously described. For example, the enterprise concept dictionary 1100 may link, relate, or otherwise associate concepts in domain dictionaries to concepts in the enterprise concept dictionary 1100. In some aspects, the enterprise concept dictionary 1100 might not link, relate, or otherwise associate domain concepts with enterprise concepts. For example, the enterprise concept dictionary 1100 might be a collection of concepts or attributes used by a plurality of domain dictionaries, without linking, relating, or otherwise associating the domain concepts or attributes to other domain concepts or attributes or enterprise concepts or attributes. In some aspects, the enterprise concept dictionary 1100 might be a single repository or storage location, such as a federated registry.

Four domain dictionaries are illustrated in FIG. 11, a Domain Dictionary 1 1105, a Domain Dictionary 2 1110, a Domain Dictionary 3 1115, and a Domain Dictionary N 1120. One of ordinary skill in the art would recognize that any number of domain dictionaries may exist. As previously described, each domain dictionary may correspond to a particular domain, such as a business domain. One or more applications may be associated with each domain dictionary. These applications may run on each domain or otherwise communicate with (or otherwise have access to) their respective domain dictionary. For example, Application A 1125, Application B 1130, Application C 1135, Application D 1140, Application E 1145, and Application F 1150 may be associated with Domain Dictionary 1 1105. Application G 1155 may be associated with Domain Dictionary 2 1110 and Domain Dictionary 3 1115. Application H 1160 and Application J 1165 may each be associated with Domain Dictionary 3 1115. Application K 1170 and Application L 1175 may each be associated with Domain Dictionary N 1120.

Each application might have its own application dictionary that identifies and defines one or more concepts, similar to the enterprise concept dictionary and/or domain dictionaries previously described. In some aspects, a concept or term in an application dictionary may be linked, related to, or otherwise associated with a concept or term in a domain dictionary. Some applications might not have their own dictionaries. For example, Application B 1130 and Application H 1160 might not have dictionaries. Instead, Application B and Application H might utilize one or more domain dictionary for concepts and terms, as will be described in further detail in the examples below. An application may comprise, for example, an operating system, a database, an enterprise application, a mobile application, a network device, and/or any other software or hardware component.

Applications may be configured to generate one or more logs, such as a data log file. Data logs may include information identifying, for example, actions taken by users, the user(s) taking each action, errors occurring during execution of actions in the application, date and/or time information for each action, and performance statistics of the application, among numerous other types of information. For example, a log might indicate that an application shut down too quickly or did not open. Logs may be formatted differently for each application or type of application. For example, an operating system may format a data log differently from a database. Logs may also use different concepts or terms for the information included in each log. For example, one application may use the concept name "Party Identifier" for the party identifier of a customer of an institution, such as a financial institution. On the other hand, a different application may use the concept name "Party_ID" for the party identifier of a customer. As will be discussed in further detail in the examples that follow, concepts in application dictionaries, mapping dictionaries, and/or domain dictionaries may be linked, related to, or otherwise associated with concepts in another dictionary.

Figure 12:
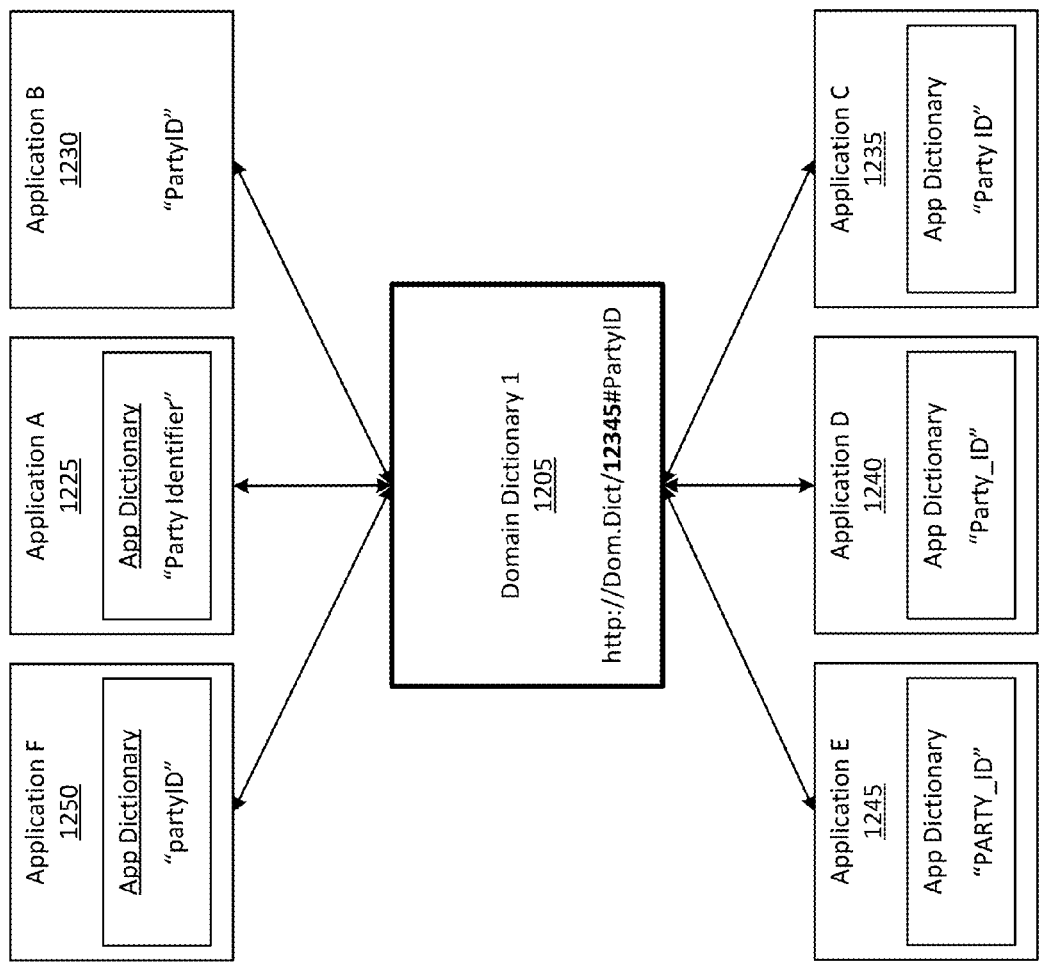
FIG. 12 is a block diagram of an example of a domain dictionary and examples of various applications.

FIG. 12 is a block diagram of an example of a domain dictionary 1 1205 and examples of various applications associated with the domain dictionary, including Application A 1225, Application B 1230, Application C 1235, Application D 1240, Application E 1245, and Application F 1250. Domain dictionary 1 1205 might define a concept "PartyID" for the party identifier of a customer of an institution. In some aspects, "PartyID" may be the common term (e.g., proper term or canonical term) used by the particular business domain. Application A 1225 might use concepts from its own dictionary in addition to (or instead of) concepts from the domain dictionary 1 1205. For example, application A 1225 might use the term "Party Identifier" from its own dictionary, instead of the term "PartyID" from the domain dictionary. Application B 1230, on the other hand, might use the concepts from the domain dictionary 1 1205 (e.g., "PartyID"). If application B 1230 does not use any of its own concept names, it might not have its own application dictionary. Application C 1235 may use the term "Party ID" from its own application dictionary, instead of the term "PartyID" from the domain dictionary. Similarly, application D 1240 may use the term "Party_ID" from its own application dictionary; application E 1245 may use the term "PARTY_ID" from its own application dictionary; application F 1250 may use the term "partyID" from its own application dictionary. As will be discussed in further detail in the examples that follow, each of the terms "Party Identifier," "Party ID," "Party_ID," "PARTY_ID," and "partyID" used by the applications may be mapped to the common (e.g., canonical) term "PartyID" used by the business domain.

Figure 13:
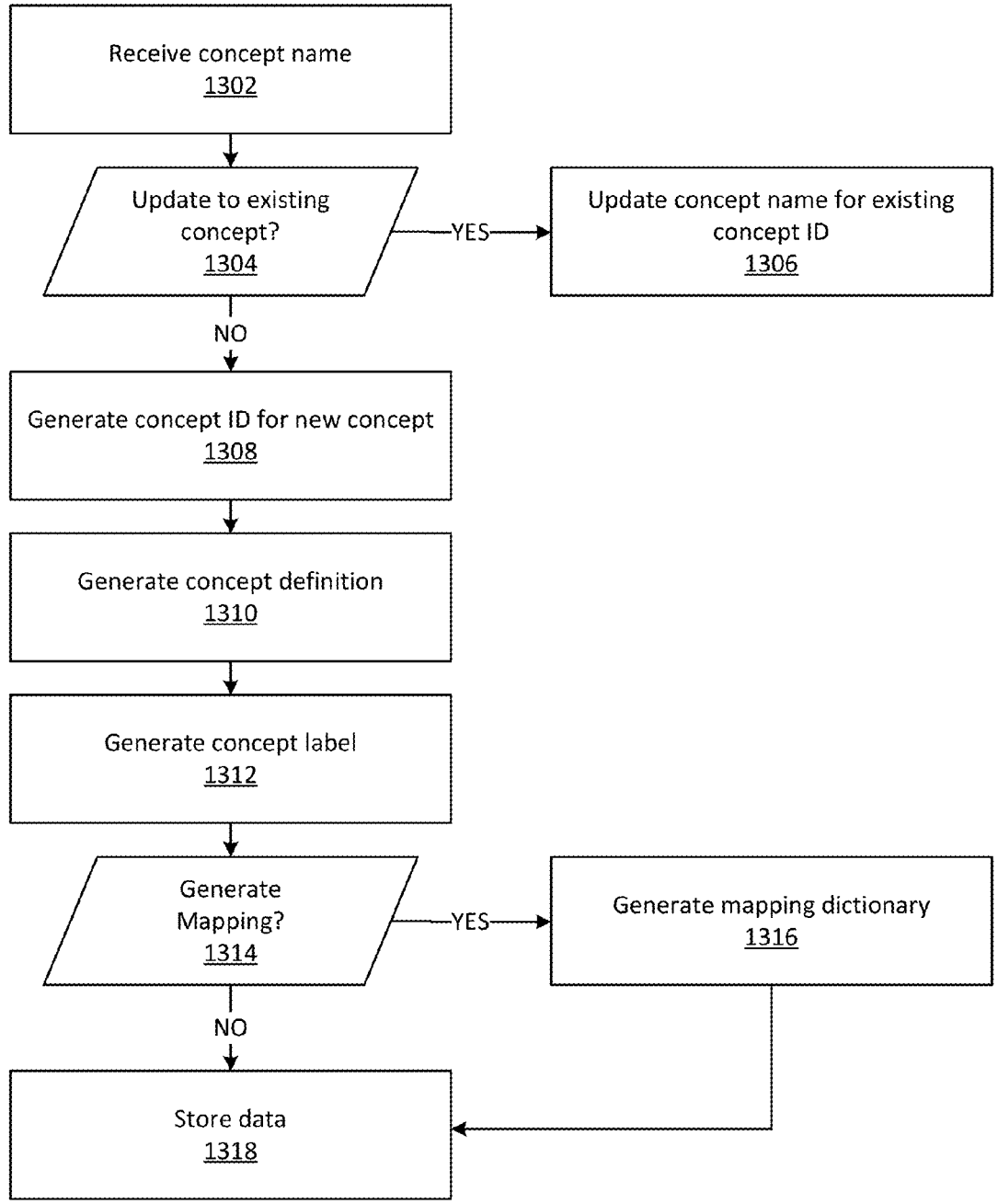
FIG. 13 is a flowchart of example method steps for generating and/or updating concept entries in a domain dictionary and/or an application dictionary.

FIG. 13 is a flowchart of example method steps for generating and/or updating concept entries in a domain dictionary and/or an application dictionary. In step 1302, a computing device may receive a name for a concept. For example, a user (such as the librarian, modeler, or any other user) may input the concept name via a graphical user interface. Additionally or alternatively, an application may provide the concept name. The concept name may be, for example, "PartyID." In step 1304, the computing device may determine whether the received concept name is an update to a concept existing, for example, in the domain dictionary. The computing device may make this determination based on the unique concept ID associated with the received concept name, as previously discussed. For example, the concept name "PartyID" might be stored in association with a concept ID "XXXX32," which may be used to determine whether the concept already exists in the domain dictionary.

If the concept name is an update to an existing concept (step 1304: Yes), the computing device may update the concept name for the existing concept ID in step 1306. For example, assume that the existing concept name for the party identifier identifying a customer is "PartyIDENTIFIER." A user (or application) may provide "PartyID" for the concept ID XXXX32, indicating that the user desires to change the concept name for concept ID XXXX32 from "PartyIDENTIFIER" to "PartyID." When the computing device receives the new concept name "PartyID," the computing device may update the domain dictionary with the new concept name "PartyID" in step 1306.

If the concept name is not an update to an existing concept (step 1304: No), the computing device may determine that the concept is new and proceed to create a new entry for the domain dictionary. The computing device may make this determination if the user inputs a concept name that is not associated with a concept ID. In step 1308, the computing device may generate a concept ID for the new concept. For example, the generated concept ID might be XXXX32 or in any other format, as previously discussed. The concept ID may be unique to that concept and be automatically generated by a software program or web-based program. For example, the concept ID may be generated using WIKI Markup.

In step 1310, the computing device may generate a concept definition for the new concept. In some aspects, the user may be prompted to provide a definition. In other aspects (and as previously discussed), the computing device may attempt to retrieve a definition from another location, such as from the web and/or from a business domain database storing definitions.

In step 1312, the computing device may generate one or more labels for the new concept. The labels may identify the context that each concept may be used. For example, a security label may indicate that the concept is used for security purposes as described herein. As another example, a business label may indicate that the concept is used for business purposes as described herein. Another label may be a logging label. In some aspects, the logging label may indicate that the concept is used during logging by one or more applications.

A user may input the label(s) for each concept. Additionally or alternatively, the label(s) may be automatically determined or generated by the computing device based on a determination of the appropriate label. For example, the computing device may determine that a security application uses the concept and add a security label based on the determination. If the security application (or a different application) also uses the concept for data logging, the computing device may add a logging label for the concept. Any number of labels may be added (or removed) using the foregoing methods.

In step 1314, the computing device may determine whether to generate one or more mapping dictionaries for the concept. If so, the computing device may generate the mapping dictionary in step 1316. The mapping dictionaries may be used to map an application-specific concept name to a domain dictionary name. In some aspects, the mapping dictionaries may be stored with or be part of the domain dictionary. For example, the domain dictionary may store multiple concept names for a single concept ID, such as "PartyID," "Party Identifier," "Party ID," "Party_ID," "PARTY_ID," and "partyID" for the concept ID XXXX32. One of the concept names, such as "PartyID," may also be identified as the primary concept name, whereas the remaining concept names may be identified as secondary names. Alternatively, mapping dictionaries may be generated separately from the domain dictionary. These separate mapping dictionaries might be similar to the domain dictionaries, except that they might use the application-specific concept name, such as "Party Identifier," "Party ID," "Party_ID," "PARTY_ID," and "partyID" for the concept ID XXXX32. By mapping the application-specific concept names to the domain dictionary concept names and/or concept IDs, applications may be able to use their own concept names rather than using concept names used by the domain dictionary. This may be beneficial if, for example, the application is a legacy application having its own logging structure and/or concept names.

In step 1318, the computing device may store the concept name, concept ID, definition, label and mapping data, such as in one or more domain dictionary or mapping dictionary. The domain dictionaries may be generated in two formats: (1) a user-readable format, such as an HTML table or other user-readable interface and (2) a machine-readable format, such as in the form of JavaScript Object Notation for Linked Data (JSON-LD) or any other linked data format, such as Resource Description Framework (RDF), Extensible Markup Language (XML), or any other format utilizing URIs, such as URLs, to link information and/or other format otherwise utilizing context (e.g., semantics) fields.

The user-readable format may include one or more data fields, such as concept name, concept ID, labels, and definition, and corresponding values, as previously discussed. The data fields and values may be stored in a concept repository. An example table is provided herein:

| Name | Concept ID | Label | Definition |
|---|---|---|---|
| Action_AcctLock | /XXXXX1 | security, logging | Account being locked out |
| Action_AcctMods | /XXXXX2 | security, logging | Changing of account/role/permissions |
| Action_FailedAccess | /XXXXX3 | security, logging | Attempts to access data, where as they were denied |
| Action_Login | /XXXXX4 | security, logging | Login events captured |
| AddressLine 1 | /XXXXX5 | security, logging | Captures if the event record has accessed/viewed AddressLine 1 |
| AddressLine 2 | /XXXXX6 | security, logging | Captures if the event record has accessed/viewed AddressLine 2 |
| AIT | /XXXXX7 | business, logging | Number associated with your businesslication from the Businesslication Inventory Tool (AIT). |
| BusinesslicationNumber | /XXXXX8 | business, logging | COPS businesslication number. Will be a legacy number. |
| BusinesslicationSubSectionName | /XXXXX9 | business, logging | tells us if the businesslication has subsections/screens/sub-businesslications |
| BusinesslicationSubSectionNumber | /XXXX10 | business, logging | This indicates an businesslication subsection, or screen, or sub-businesslication. |
| CDNumber | /XXXX11 | security, logging | Captures if the event record has accessed/viewed CDNumber |
| ChallengeResponse | /XXXX12 | security, logging | Captures if the event record has accessed/viewed ChallengeResponse |
| City | /XXXX13 | security, logging | Captures if the event record has accessed/viewed City |
| ClientUniqueIdentifierforMessage | /XXXX14 | security, logging | Captures if the event record has accessed/viewed ClientUniqueIdentifierforMessage |
| CreditCardNumber | /XXXX15 | security, logging | Captures if the event record has accessed/viewed CreditCardNumber |
| CustomerAccountNumber | /XXXX16 | security, logging | Captures unique identifier like account number, etc. |
| DateTimeAccessed_EndUSer | /XXXX17 | business, logging | Event Date and Time of end users timezone. |
| DebitCardNumber | /XXXX18 | security, logging | Captures if the event record has accessed/viewed DebitCardNumber |
| Email | /XXXX19 | security, logging | Captures if the event record has accessed/viewed Email |
| Employee_NBK | /XXXX20 | business, logging | Associate NBK |
| Employee_PersonNumber | /XXXX21 | business, logging | Associate Person Number |
| FirstName | /XXXX22 | security, logging | Captures if the event record has accessed/viewed FirstName |
| HELOCNumber | /XXXX23 | security, logging | Captures if the event record has accessed/viewed HELOCNumber |
| Identification | /XXXX24 | security, logging | Captures if the event record has accessed/viewed Identification |
| InsurancePolicyNumber | /XXXX25 | security, logging | Captures if the event record has accessed/viewed InsurancePolicyNumber |
| IP Address_EndUser | /XXXX26 | business, logging | IP Address of the end user performing the action |
| IPAddress | /XXXX27 | business, logging | IP Address of the machine sending the data |
| LastName | /XXXX28 | security, logging | Captures if the event record has accessed/viewed LastName |
| MachineName | /XXXX29 | business, logging | Name of machine |
| MortgageLoanNumber | /XXXX30 | security, logging | Captures if the event record has accessed/viewed MortgageLoanNumber |
| OtherAccountNumber | /XXXX31 | security, logging | Captures if the event record has accessed/viewed OtherAccountNumber |
| PartyID | /XXXX32 | security, logging | Captures the corporate customer number/party id of the customer |
| Phone | /XXXX33 | security, logging | Captures if the event record has accessed/viewed Phone |
| PIN_Password | /XXXX34 | security, logging | Captures if the event record has accessed/viewed PIN_Password |

-continued

| Name | Concept ID | Label | Definition |
|---|---|---|---|
| ReceiveDate | /XXXX35 | security, logging | The date the record was received by COPS |
| RegistrationStatus | /XXXX36 | business, logging | Status of businesslication. DEV, Retired, Prod |
| RegistrationStatus (Subsection related) | /XXXX37 | business, logging | Status of sub-businesslication |
| SSN_TIN | /XXXX38 | security, logging | Captures if the event record has accessed viewed SSN |
| State | /XXXX39 | security, logging | Captures if the event record has accessed/viewed State |
| UTCTimeOffset | /XXXX40 | security logging, | UTC Offset |
| ZIP | /XXXX41 | security, logging | Captures if the event record has accessed/viewed ZIP |

A corresponding machine-readable domain dictionary may also be generated, such as in the form of a JSON-LD file, which may be named, for example, "domain1-dictionary.jsonld" (or something similar):

```
{
    "@context": {
        "domain1": "http://institution.com/",
        "Action_AcctLock": {
            "@id":"domain1:XXXXX1", "@type": "@id"
        },
        "Action_AcctMods": {
            "@id":"domain1:XXXXX2", "@type": "@id"
        },
        "Action_FailedAccess": {
            "@id":"domain1:XXXXX3", "@type": "@id"
        },
        "Action_Login": {
            "@id":"domain1:XXXXX4", "@type": "@id"
        },
        "AddressLine1": {
            "@id":"domain1:XXXXX5", "@type": "@id"
        },
        "AddressLine2": {
            "@id":"domain1:XXXXX6", "@type": "@id"
        },
        "AIT": {
            "@id":"domain1:XXXXX7", "@type": "@id"
        },
        "ApplicationNumber": {
            "@id":"domain1:XXXXX8", "@type": "@id"
        },
        "ApplicationSubSectionName": {
            "@id":"domain1:XXXXX9", "@type": "@id"
        },
        "ApplicationSubSectionNumber": {
            "@id":"domain1:XXXX10", "@type": "@id"
        },
        "CDNumber": {
            "@id":"domain1:XXXX11", "@type": "@id"
        },
        "ChallengeResponse": {
            "@id":"domain1:XXXX12", "@type": "@id"
        },
        "City": {
            "@id":"domain1:XXXX13", "@type": "@id"
        },
        "ClientUniqueIdentifierforMessage": {
            "@id":"domain1:XXXX14", "@type": "@id"
        },
        "CreditCardNumber": {
            "@id":"domain1:XXXX15", "@type": "@id"
        },
        "CustomerAccountNumber": {
            "@id":"domain1:XXXX16", "@type": "@id"
        },
        "DateTimeAccessed_EndUSer": {
            "@id":"domain1:XXXX17", "@type": "@id"
        },
```

-continued

```
        },
        "DebitCardNumber": {
            "@id":"domain1:XXXX18", "@type": "@id"
        },
        "Email": {
            "@id":"domain1:XXXX19", "@type": "@id"
        },
        "Employee_NBK": {
            "@id":"domain1:XXXX20", "@type": "@id"
        },
        "Employee_PersonNumber": {
            "@id":"domain1:XXXX21", "@type": "@id"
        },
        "FirstName": {
            "@id":"domain1:XXXX22", "@type": "@id"
        },
        "HELOCNumber": {
            "@id":"domain1:XXXX23", "@type": "@id"
        },
        "Identification": {
            "@id":"domain1:XXXX24", "@type": "@id"
        },
        "InsurancePolicyNumber": {
            "@id":"domain1:XXXX25", "@type": "@id"
        },
        "IP Address_EndUser": {
            "@id":"domain1:XXXX26", "@type": "@id"
        },
        "IPAddress": {
            "@id":"domain1:XXXX27", "@type": "@id"
        },
        "LastName": {
            "@id":"domain1:XXXX28", "@type": "@id"
        },
        "MachineName": {
            "@id":"domain1:XXXX29", "@type": "@id"
        },
        "MortgageLoanNumber": {
            "@id":"domain1:XXXX30", "@type": "@id"
        },
        "OtherAccountNumber": {
            "@id":"domain1:XXXX31", "@type": "@id"
        },
        "PartyID": {
            "@id":"domain1:XXXX32", "@type": "@id"
        },
        "Phone": {
            "@id":"domain1:XXXX33", "@type": "@id"
        },
        "PIN_Password": {
            "@id":"domain1:XXXX34", "@type": "@id"
        },
        "ReceiveDate": {
            "@id":"domain1:XXXX35", "@type": "@id"
        },
        "RegistrationStatus": {
            "@id":"domain1:XXXX36", "@type": "@id"
        },
```

-continued

```
    "RegistrationStatus (Subsection related)": {
        "@id":"domain1:XXXX37", "@type": "@id"
    },
    "SSN_TIN": {
        "@id":"domain1:XXXX38", "@type": "@id"
    },
    "State": {
        "@id":"domain1:XXXX39", "@type": "@id"
    },
    "UTCTimeOffset": {
        "@id":"domain1:XXXX40", "@type": "@id"
    },
    "ZIP": {
        "@id":"domain1:XXXX41", "@type": "@id"
    }
  }
}
```

The mapping dictionaries and/or application dictionaries may also be generated in user-readable format and/or machine-readable format. If an application uses its own concept name(s) (e.g., in an application dictionary), the application may reference, link, or otherwise associate its concept name(s) with concept name(s) in the domain dictionary via a concept ID. An example JSON-LD file for an application that uses the concept name "partyID" (rather than the domain dictionary concept name "PartyID"), which may be named, for example, "application1 -dictionary.jsonld" (or something similar), may be as follows:

```
{
  "@context": {
    "@base": "http://u.go/domain1-dictionary",
    "domain1": "http://institution.com/",
    "partyID": {
        "@id":"domain1:XXXX32", "@type": "@id"
    }
  }
}
```

In this example jsonld file, the application may identify the domain dictionary via a URL "http://u.go/domain1-dictionary," identify the domain via a URL "http://institution.com/," identify the concept name it uses "partyID," and identify the concept ID "domain1 :XXXX32" associated with the concept name. As illustrated in the domain dictionary above, the concept ID "domain1:XXXX32" may be associated with concept name "PartyID" used by the domain dictionary. By using this mapping, the application may conveniently use one or more of its own terms.

Figure 14:
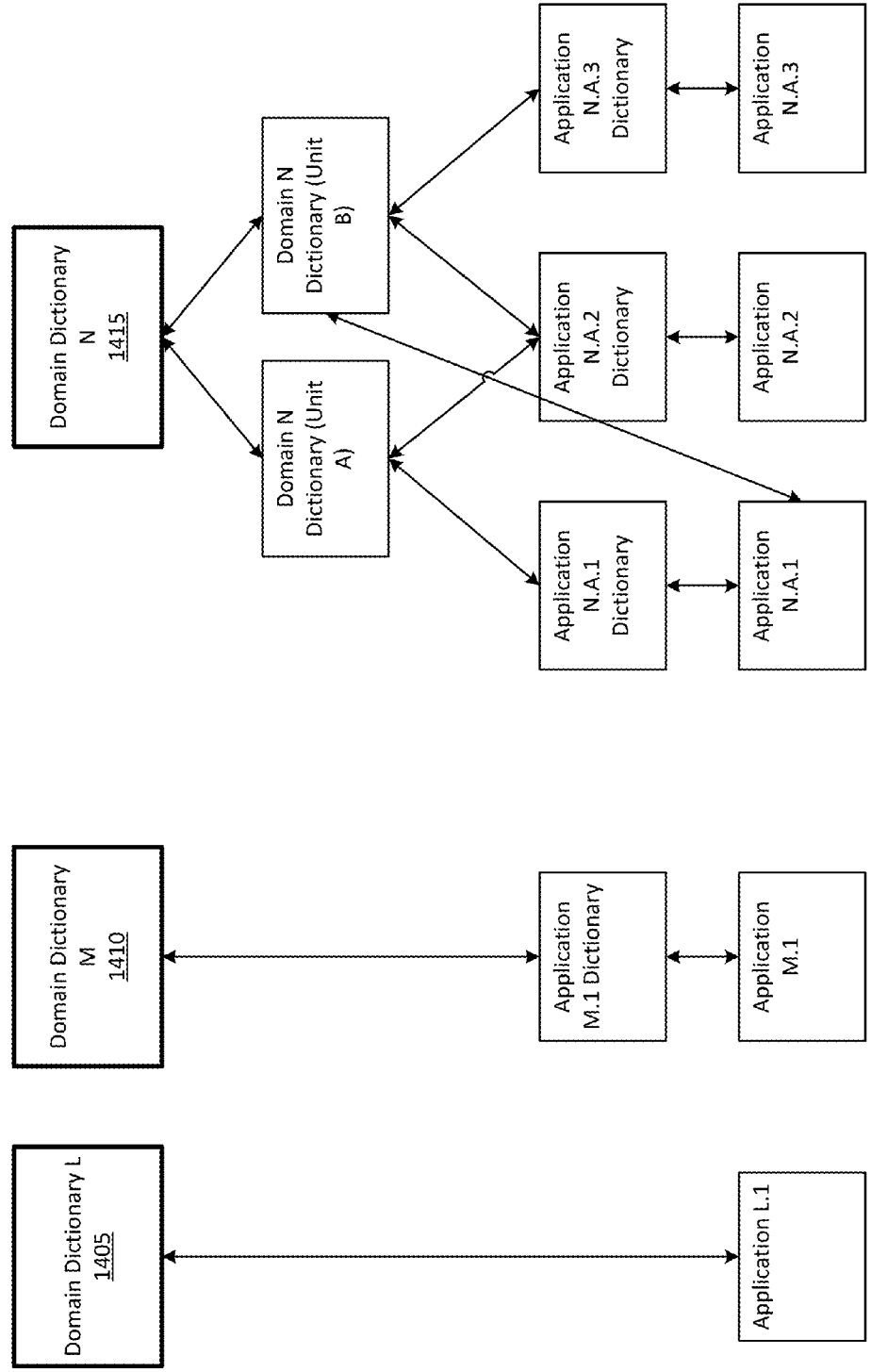
FIG. 14 illustrates block diagrams of example interactions between applications and application dictionaries and/or domain dictionaries.

FIG. 14 illustrates block diagrams of example interactions between applications and application dictionaries and/or domain dictionaries. In some aspects, an application, such as application L.1, may directly use a domain dictionary L 1405. Thus application L.1 might not use an application dictionary or a mapping dictionary. In some aspects, an application, such as application M.1, may use its own application M.1 dictionary. Thus the concept names used by application M.1. might be mapped to the domain dictionary M 1410, as previously discussed.

In some aspects, an application, such as application N.A.1, may use concept names from its own application N.A.1 dictionary as well concept names from a domain dictionary, such as domain N dictionary (Unit B). Thus some of the concept names used by application N.A.1. might be mapped to one or more domain dictionary, such as domain dictionary N 1415 and/or domain N dictionary (Unit B). On the other hand, concepts that application N.A.1 uses directly from a domain dictionary might not need to be mapped. As illustrated, the domain dictionary N 1415 may have two sub-dictionaries, Unit A and Unit B. Applications may choose to use one or more of these sub-dictionaries.

An application that uses its own dictionary can annotate data elements in a data log to map elements in the log to concept names used by the domain dictionary. Thus, an application concept name can be tied to a canonical concept name in the domain dictionary. Accordingly, each time an application concept name is referenced, such as in a data log, the business domain, analytical engines having access to the domain dictionary, or other applications may identify the proper concept name from the domain dictionary. Using this mapping technique, analytical engines may be able to onboard and maintain applications more conveniently, consume and/or analyze data logs quicker, and generate analytical reports more quickly.

Figure 15:
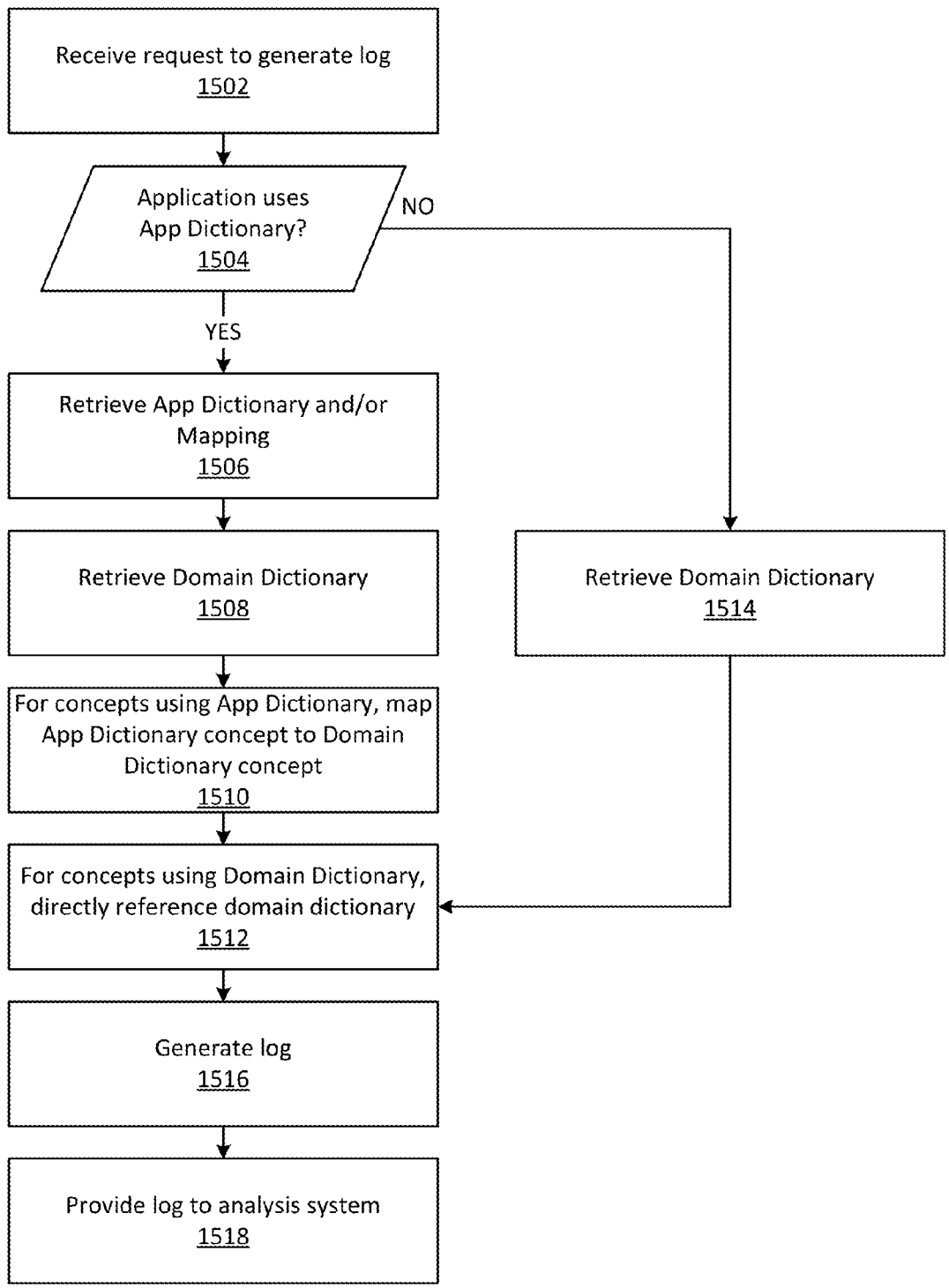
FIG. 15 is a flowchart of example method steps for generating a log using one or more dictionaries.

FIG. 15 is a flowchart of example method steps for generating a log using one or more dictionaries. In step 1502, an application may receive a request to generate a log, such as in response to an event as illustrated in the table above. For example, a user may issue a command to generate the log, such as via a user interface on a workstation. Additionally or alternatively, a computing device associated with a business domain may send a command to the application to generate the log. In some aspects, the application may periodically generate logs.

In step 1504, the application may determine whether the application uses an application dictionary. If the application uses an application dictionary (step 1504: Yes), it may retrieve the application dictionary in step 1506. The application may also retrieve a mapping, such as a mapping dictionary or file, that maps one or more concept names in the application dictionary to one or more concept names in the domain dictionary in step 1506. The application dictionary may be stored, for example, within the application (or associated database). The mapping may also be stored, for example, within the application (or associated database), or it may be stored within a particular domain, such as a related business domain.

In step 1508, the application may retrieve the domain dictionary. In step 1510, for concept names found in the application dictionary, the application may map the application dictionary concept names to a concept ID that may be stored in the domain dictionary, as previously discussed. In step 1512, for concept names taken from the domain dictionary, the application may directly reference the domain dictionary (rather than generating a mapping). If the application does not use an application dictionary for any concepts (step 1504: No), the application may retrieve the domain dictionary in step 1514 and directly reference the domain dictionary for concepts the application plans to include in the log.

In step 1516, the application may generate the log using the domain dictionary, the application dictionary, and/or the mapping dictionary or file. In particular, the log might include several field—value pairs related to a particular action. Example actions were previously illustrated in the user-readable table previously discussed. For example, if a customer of an institution, such as a financial institution, attempts to access data, but the access is denied, the log may include a concept name "Action_FailedAccess" (if the domain dictionary is used) or concept name "Customer_Access_Attempt" with a reference to concept ID XXXXX3 (if an application dictionary having the concept name "Customer_Access_Attempt" is used). The log might also indicate the time and date of the access attempt and/or the IP address of the customer attempting to access the data (e.g., "IP Address_EndUser" if the domain dictionary is used). Any of the concepts illustrated in the above table, as well as concepts not illustrated, may be included in generated logs.

In step 1516, the log may be provided to an analysis system (e.g., an analytical engine) to process the data. In some aspects, the analysis system may have access to the domain dictionary. By accessing the domain dictionary and the mapping for application-specific concept names, analysis systems may be able to onboard and maintain applications more conveniently, consume and/or analyze data logs quicker, and generate analytical reports more quickly. For example, the analysis systems may search and report analytics across multiple applications, such as search and analytical dashboards, because of the use of common concept IDs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining that a data security event or a data logging event occurs at an application running on a computing domain;
   in response to determining that the data security event or the data logging event occurs at the application running on the computing domain, determining, by a computing device having a processor and memory, that the application uses a first concept name from an application dictionary associated with the application to describe the data security event or the data logging event;
   generating, by the computing device, an entry for the data security event or the data logging event and adding the entry to a data log for the application running on the computing domain, wherein the entry includes the first concept name from the application dictionary associated with the application;
   determining, by the computing device, that the first concept name from the application dictionary corresponds to a second concept name from a domain dictionary associated with a plurality of applications running on the computing domain; and
   generating a mapping of the first concept name from the application dictionary to the second concept name from the domain dictionary associated with the plurality of applications running on the computing domain.

2. The method of claim 1, wherein generating the mapping comprises generating a mapping file that identifies the domain dictionary, the first concept name from the application dictionary, and a concept identifier for the data security event or the data logging event.

3. The method of claim 2, wherein the mapping file does not identify the second concept name from the domain dictionary.

4. The method of claim 2, wherein the mapping file comprises a JavaScript Object Notation for Linked Data (JSON-LD) file.

5. The method of claim 1, wherein the domain dictionary comprises a plurality of concept names including the second concept name, and wherein each of the plurality of concept names corresponds to a concept identifier.

6. The method of claim 5, wherein the domain dictionary comprises a JavaScript Object Notation for Linked Data (JSON-LD) file.

7. The method of claim 1, wherein generating the mapping comprises:
   associating the first concept name from the application dictionary to a concept identifier; and
   associating the second concept name from the domain dictionary to the concept identifier.

8. The method of claim 1, further comprising:
   in response to a determination that a second event occurs at the application, determining, by the computing device, that the application uses a third concept name from the domain dictionary to describe the second event; and
   adding a second entry for the second event to the data log for the application, wherein the second entry includes the third concept name from the domain dictionary.

9. The method of claim 1, further comprising:
   sending the data log to a data log analysis system, wherein the data log analysis system is capable of accessing the domain dictionary.

10. A non-transitory computer-readable medium storing computer-readable instructions that, when read by a computing device, cause the computing device to:
    in response to a determination that an event occurs at an application, determine that the application uses a first concept name from an application dictionary to describe the event;
    add an entry for the event to a data log for the application, wherein the entry includes the first concept name from the application dictionary; and
    generate a mapping of the first concept name from the application dictionary to a second concept name from a domain dictionary, wherein the domain dictionary is different from the application dictionary, wherein generating the mapping comprises generating a mapping file that identifies the domain dictionary, the first concept name from the application dictionary, and a concept identifier for the event, and wherein the mapping file comprises a JavaScript Object Notation for Linked Data (JSON-LD) file.

11. The non-transitory computer-readable medium of claim 10, storing computer-readable instructions that, when read by the computing device, further cause the computing device to:
    send the data log to a data log analysis system, wherein the data log analysis system is capable of accessing the domain dictionary.

12. The non-transitory computer-readable medium of claim 10, wherein the mapping file does not identify the second concept name from the domain dictionary.

13. The non-transitory computer-readable medium of claim 10, storing computer-readable instructions that, when read by the computing device, further cause the computing device to:
    in response to a determination that a second event occurs at the application, determine that the application uses a third concept name from the domain dictionary to describe the second event; and
    add a second entry for the second event to the data log for the application, wherein the second entry includes the third concept name from the domain dictionary.

14. The non-transitory computer-readable medium of claim 10, wherein the domain dictionary comprises a plurality of concept names including the second concept name, and wherein each of the plurality of concept names corresponds to a concept identifier.

15. The non-transitory computer-readable medium of claim 14, wherein the domain dictionary comprises a JavaScript Object Notation for Linked Data (JSON-LD) file.

16. The non-transitory computer-readable medium of claim 10, wherein generating the mapping comprises:
   associating the first concept name from the application dictionary to the concept identifier; and
   associating the second concept name from the domain dictionary to the concept identifier.

17. An apparatus comprising:
   a processor; and
   memory storing computer-executable instructions that, when executed by the processor, cause the apparatus to:
   determine that a data security event or a data logging event occurs at an application running on a computing domain;
   in response to determining that the data security event or the data logging event occurs at the application running on the computing domain, determine that the application uses a first concept name from an application dictionary associated with the application to describe the data security event or the data logging event;
   generate an entry for the data security event or the data logging event and add the entry to a data log for the application running on the computing domain, wherein the entry includes the first concept name from the application dictionary associated with the application;
   determine that the first concept name from the application dictionary corresponds to a second concept name from a domain dictionary associated with a plurality of applications running on the computing domain; and
   generate a mapping of the first concept name from the application dictionary to the second concept name from the domain dictionary associated with the plurality of applications running on the computing domain.

18. The apparatus of claim 17, wherein generating the mapping comprises:
   associating the first concept name from the application dictionary to a concept identifier; and
   associating the second concept name from the domain dictionary to the concept identifier.

* * * * *